(12) United States Patent
Lee et al.

(10) Patent No.: US 10,902,216 B2
(45) Date of Patent: Jan. 26, 2021

(54) PARALLEL PROCESSING-BASED TRANSLATION METHOD AND APPARATUS

(71) Applicant: SAMSUNG ELECTRONICS CO., LTD., Suwon-si (KR)

(72) Inventors: Hodong Lee, Yongin-si (KR); Youngki Park, Seoul (KR); Hwidong Na, Suwon-si (KR); Minyoung Mun, Seoul (KR); Inchul Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/450,333

(22) Filed: Mar. 6, 2017

(65) Prior Publication Data

US 2018/0046618 A1 Feb. 15, 2018

(30) Foreign Application Priority Data

Aug. 10, 2016 (KR) ........................ 10-2016-0101726

(51) Int. Cl.
| | |
|---|---|
| *G06F 40/47* | (2020.01) |
| *G06F 16/33* | (2019.01) |
| *G06N 3/04* | (2006.01) |
| *G06N 3/063* | (2006.01) |
| *G06N 3/08* | (2006.01) |

(Continued)

(52) U.S. Cl.
CPC .......... *G06F 40/47* (2020.01); *G06F 16/3344* (2019.01); *G06F 40/51* (2020.01); *G06F 40/53* (2020.01); *G06F 40/58* (2020.01); *G06N 3/0445* (2013.01); *G06N 3/0454* (2013.01); *G06N 3/063* (2013.01); *G06N 3/08* (2013.01)

(58) Field of Classification Search
CPC .............. G06F 17/289; G06F 17/2872; G06F 17/2795; G06F 17/28; G06F 17/2818; G06F 17/2854
See application file for complete search history.

(56) References Cited

U.S. PATENT DOCUMENTS

| | | |
|---|---|---|
| 8,150,677 B2 | 4/2012 | Menezes et al. |
| 8,180,624 B2 | 5/2012 | Moore |

(Continued)

OTHER PUBLICATIONS

Matthew Henderson et al., "Discriminative Spoken Language Understanding Using Word Confusion Networks," Spoken Language Technology Workshop (SLT), 2012, IEEE, pp. 1-6.*

(Continued)

*Primary Examiner* — Richemond Dorvil
*Assistant Examiner* — Mark Villena
(74) *Attorney, Agent, or Firm* — NSIP Law

(57) ABSTRACT

A translation method and apparatus may respectively perform or include: using one or more processors, plural different translation processes, in parallel, for a source sentence in a first language, including encoding, to generate respective feature vectors, the source sentence in each of two or more translation processes of the plural translation processes or the source sentence and a variation of the source sentence in respective translation processes of the plural translation processes, and decoding each of the respective feature vectors to generate respective plural candidate sentences in a second language; and selecting a final sentence in the second language from the respective plural candidate sentences in the second language.

36 Claims, 13 Drawing Sheets

(51) Int. Cl.
*G06F 40/51* (2020.01)
*G06F 40/53* (2020.01)
*G06F 40/58* (2020.01)

(56) References Cited

U.S. PATENT DOCUMENTS

| | | | |
|---|---|---|---|
| 8,296,123 B2 | 10/2012 | Thayer et al. | |
| 8,326,598 B1 | 12/2012 | Macherey et al. | |
| 8,527,276 B1 | 9/2013 | Senior et al. | |
| 8,606,559 B2 | 12/2013 | Jin et al. | |
| 8,744,834 B2 | 6/2014 | Macherey et al. | |
| 8,798,988 B1* | 8/2014 | Upstill | G06F 17/2795 704/1 |
| 8,855,995 B1 | 10/2014 | Macherey et al. | |
| 8,886,514 B2 | 11/2014 | Ueffing | |
| 8,914,401 B2 | 12/2014 | Johnston | |
| 9,858,272 B2* | 1/2018 | Bareket | G06F 17/289 |
| 2003/0115059 A1 | 6/2003 | Jayaratne | |
| 2004/0260543 A1* | 12/2004 | Horowitz | G10L 15/193 704/221 |
| 2008/0077386 A1* | 3/2008 | Gao | G06F 17/28 704/3 |
| 2011/0131032 A1 | 6/2011 | Yang et al. | |
| 2011/0134910 A1* | 6/2011 | Chao-Suren | G06F 17/289 370/352 |
| 2014/0278350 A1* | 9/2014 | Scriffignano | G06F 17/2223 704/8 |
| 2014/0303960 A1* | 10/2014 | Orsini | G06F 17/2854 704/2 |
| 2014/0358524 A1* | 12/2014 | Papula | G06F 17/2854 704/9 |
| 2015/0286634 A1 | 10/2015 | Shin et al. | |
| 2015/0293908 A1* | 10/2015 | Mathur | G06F 17/30684 704/2 |
| 2015/0356401 A1 | 12/2015 | Vinyals et al. | |
| 2016/0117316 A1* | 4/2016 | Le | G06F 7/023 704/9 |
| 2016/0147740 A1* | 5/2016 | Gao | G06F 17/289 704/2 |

OTHER PUBLICATIONS

Cho, Kyunghyun, et al.,"On the properties of neural machine translation: Encoder-decoder approaches," 2012, pp. 1-9.*
Sutskever, Ilya, Oriol Vinyals, and Quoc V. Le, "Sequence to sequence learning with neural networks," Advances in neural information processing systems, 2014, pp. 1-9.*
Cho, Kyunghyun, "Noisy parallel approximate decoding for conditional recurrent language model," 2016, pp. 1-10.*
Boxing Chen et al., "Two-Stage Hypotheses Generation for Spoken Language Translation," ACM Transactions on Asian Language Information Processing, vol. 8, No. 1, Article 4, pp. 1-22 (Year: 2009).*
Moldovan, Dan et al., "SNAP: Parallel Processing Applied to AI", Computer, *IEEE Computer Society*, vol. 25, No. 5, May 1, 1992 (pp. 39-49).
Extended European Search Report dated Dec. 15, 2017 in corresponding European Patent Application No. 17180037.8 (9 pages in English).
European Office Action dated Jul. 18, 2019 in corresponding European Patent Application No. 17 180 037.8 (9 pages in English).
Ren et al., "Parallel Machine Translation: Principles and Practice," Engineering of Complex Computer Systems, 2001, Proceedings, Seventh IEEE International Conference on Jun. 11-13, 2001, Piscataway, NJ, USA, pp. 249-259 (11 pages in English).

* cited by examiner

FIG. 4

| |
|---|
| Source sentence: 강남역까지 가는 길을 알려줘. |
| 강남역까지 어떻게 가죠? |
| 강남역까지 어떻게 가죠 |
| 강남역까지 가는 길을 알려주세요. |
| 강남역까지 가는 길이 어떻게 됩니까? |
| 강남역까지 어떻게 가나요? |
| 강남역으로 어떻게 가나요? |
| 강남역으로 가는 길을 알려주세요. |
| 강남역으로 가는 길을 알려줘. |
| 강남역으로 가는 길을 알려줘 |
| 강남역으로 가는 길을 알려주세요 |
| 강남역으로 가는 길을 알려주시겠습니까? |
| 강남역으로 어떻게 갈까요? |
| 강남역까지 어떻게 갈까요 |

PARALLEL PROCESSING-BASED TRANSLATION METHOD AND APPARATUS

CROSS-REFERENCE TO RELATED APPLICATION(S)

This application claims the benefit under 35 USC § 119(a) of Korean Patent Application No. 10-2016-0101726 filed on Aug. 10, 2016, in the Korean Intellectual Property Office, the entire disclosure of which is incorporated herein by reference for all purposes.

BACKGROUND

1. Field

The following description relates to a parallel processing-based translation method and apparatus.

2. Description of Related Art

A development in the Internet and information telecommunication (IT) technology enables the provision of contents in various languages. Globalization in businesses, in particular, has accelerated a development in translation technology for communication among users using various languages and contents translation provided in various languages.

A difference in language among users may cause inconvenience with current translation hardware and technology because of the greater amount of time that may be needed for translation and the greater number of stages that may be needed for each translation to deliver more accurate expressions and meanings in providing translation results for communication among users of different languages, for example.

SUMMARY

This Summary is provided to introduce a selection of concepts in a simplified form that are further described below in the Detailed Description. This Summary is not intended to identify key features or essential features of the claimed subject matter, nor is this Summary intended to be used as an aid in determining the scope of the claimed subject matter.

In one general aspect, a translation method includes performing, using one or more processors, plural different translation processes, in parallel, for a source sentence in a first language, including encoding, to generate respective feature vectors, the source sentence in each of two or more translation processes of the plural translation processes or the source sentence and a variation of the source sentence in respective translation processes of the plural translation processes, and decoding each of the respective feature vectors to generate respective plural candidate sentences in a second language, and selecting a final sentence in the second language from the respective plural candidate sentences in the second language.

The plural different translation processes may be implemented through different graphic processor units (GPUs), each of the GPUs including a translation encoder and a translation decoder, and the source sentence may be input to at least two of the GPUs or the source sentence may be input to at least one of the GPUs and a variation of the source sentence may be input to another at least one of the GPUs, to perform the different translation processes.

The plural different translation processes may be implemented through the one or more processors, of a translation system, that each include one or more translation encoders of plural encoders of the translation system and one or more translation decoders of plural decoders of the translation system, and the translation method may further include inputting, in parallel, the source sentence to at least two of the plural encoders.

The method may further include inputting a variation of the source sentence to at least one of the plural encoders, varying at least one of the plural encoders, and/or varying at least one of the plural decoders, for the performing of the plural different translation processes.

The method may further include generating the variation of the source sentence by changing a word order of the source sentence based on information associated with the first language and/or replacing, with a synonym, a word included in the source sentence based on the information associated with the first language, and may include inputting the variation of the source sentence to the at least one of the plural encoders.

The method may further include performing the varying of the at least one of the plural encoders, including changing the at least one encoder by respectively applying noise to a corresponding parameter value or a corresponding activation function to be respectively applied to the at least one encoder, or performing the varying of the at least one of the plural decoders, including changing the at least one decoder by respectively applying noise to a corresponding parameter value or a corresponding activation function to be respectively applied to the at least one decoder.

The method may further include varying or changing an encoder in at least one of the one or more processors and/or varying or changing a decoder in at least one of the one or more processors, for the performing of the plural different translation processes.

The method may further include at least a correspondingly one of performing the varying or changing of the encoder by replacing the encoder with another encoder having been trained by at least one of a different initial training value, training set, or training sequence than an initial training value, training set, or training sequence that was used to train the encoder, and performing the varying or changing of the decoder by replacing the decoder with another decoder having been trained by at least one of a different initial training value, training set, or training sequence than an initial training value, training set, or training sequence that was used to train the decoder.

The generating of the respective candidate sentences may include generating a preset number of candidate sentences in each translation process using respective beam search algorithms.

The respective beam search algorithms may be m-best beam search algorithms with less complexity than an n-best beam search algorithm, as n being greater than m.

The selecting of the final sentence in the second language may include calculating respective scores of multiple candidate sentences in the second language, and selecting, as the final sentence in the second language, one of the multiple candidate sentences that has a highest score among the multiple candidate sentences in the second language.

The calculating of the respective scores of the multiple candidate sentences in the second language may include calculating respective scores of only a single candidate sentence in the second language from each of the translation processes.

The selecting of the final sentence in the second language may include calculating scores corresponding to each of corresponding candidate sentences in the second language in each of the translation processes using respective rescoring models, recalculating scores corresponding to one or more of the corresponding candidate sentences from each of the translation processes using statistics of scores corresponding to each of the one or more of the corresponding candidate sentences, and selecting, as the final sentence in the second language, one of the one or more of the corresponding candidate sentences that has a highest recalculated score among the recalculated scores.

In one general aspect, a non-transitory computer-readable storage medium may store instructions that, when executed by a processor, cause the processor to perform one or more or all processes described herein.

In one general aspect, a translation apparatus includes at least one processor, of one or more processors, configured to perform plural different translation processes, in parallel, for a source sentence in a first language, including encoding, to generate respective feature vectors, the source sentence in each of two or more translation processes of the plural translation processes or the source sentence and a variation of the source sentence in respective translation processes of the plural translation processes, and decoding each of the respective feature vectors to generate respective plural candidate sentences in a second language, and an output processor, of the one or more processors, configured to select a final sentence in the second language from the respective plural candidate sentences in the second language.

The at least one processor may include at least one encoder to perform a corresponding encoding of the source sentence to generate a feature vector and at least one decoder to perform a corresponding decoding of the feature vector and to generate plural candidate sentences in the second language for the source sentence.

The translation apparatus may include different graphic processor units (GPUs) to respectively perform the plural different translation processes, each of the GPUs including a translation encoder and a translation decoder, and the translation apparatus may be configured to input the source sentence to at least two of the GPUs or the translation apparatus may input the source sentence to at least one of the GPUs and a variation of the source sentence to another at least one of the GPUs, to perform the different translation processes.

The plural different translation processes may be implemented through the at least one processor, of the one or more processors and of a translation system, that each include one or more translation encoders of plural encoders of the translation system and one or more translation decoders of plural decoders of the translation system, and the translation apparatus may be configured to input, in parallel, the source sentence to at least two of the plural encoders.

The output processor may be configured to generate the variation of the source sentence and implement encoding of the generated variation of the source sentence in at least one of the translation processes, to implement a varying of at least one of the plural encoders, and/or to implement a varying of at least one of the plural decoders, for the performing of the plural different translation processes.

A processor, of the one or more processors, may be configured to generate the variation of the source sentence and implement encoding of the generated variation of the source sentence in at least one of the translation processes, to implement a varying of at least one of the plural encoders, and/or to implement a varying of at least one of the plural decoders, for the performing of the plural different translation processes.

The processor may be configured to generate the variation of the source sentence and implement the encoding of the generated variation of the source sentence in the at least one of the translation processes, and, for the generating of the variation of the source sentence, the processor may be configured to perform at least one of the following operations of: changing a word order of the source sentence based on information associated with the first language and/or replacing, with a synonym, a word included in the source sentence based on the information associated with the first language.

For the implementing of the varying of the at least one of the plural encoders and/or the implementing of the varying of the at least one of the plural decoders, the processor may be configured to correspondingly perform at least one of the following operations of: changing the at least one of the plural encoders by respectively applying noise to a corresponding parameter value or a corresponding activation function to be respectively applied to the at least one of the plural encoders; and changing the at least one of the plural decoders by respectively applying noise to a corresponding parameter value or a corresponding activation function to respectively be applied to the at least one of the decoders.

The plural different translation processes may be implemented through plural translation processors, of the one or more processors, that each include a translation encoder and a translation decoder, and a processor, of the one or more processors and for implementing the plural different translation processes, may be configured to implement a changing or varying of one of the translation encoders of the plural translation processors by replacing the one translation encoder with another encoder having been trained by a different initial training value, training set, or training sequence than an initial training value, training set, or training sequence that was used to train the one translation encoder, and/or configured to implement a changing or varying of one of the translation decoders of the plural translation processors by replacing the one translation decoder with another decoder having been trained by a different initial training value, training set, or training sequence than an initial training value, training set, or training sequence that was used to train the one translation decoder.

The generating of the respective candidate sentences may include generating a preset number of candidate sentences in each translation process using respective beam search algorithms.

The respective beam search algorithms may be m-best beam search algorithms with less complexity than an n-best beam search algorithm, as n being greater than m.

The output processor may be further configured to calculate respective scores of multiple candidate sentences in the second language and select, as the final sentence in the second language, one of the multiple candidate sentences that has a highest score among the multiple candidate sentences in the second language.

For the calculating of the respective scores of the multiple candidate sentences in the second language, the output processor may be configured to calculate scores for only a single candidate sentence in the second language from each of the translation processes.

For performing the selecting of the final sentence in the second language, the output processor may be configured to calculate scores corresponding to each of corresponding candidate sentences in the second language in each of the translation processes using respective rescoring models, recalculate scores corresponding to one or more of the corresponding candidate sentences from each of the translation processes using statistics corresponding to each of the one or more of the corresponding candidate sentences, and select, as the final sentence in the second language, one of the one or more of the corresponding candidate sentences that has a highest recalculated score among the recalculated scores.

The translation apparatus may further include one or more memories, of plural memories of the translation apparatus, configured to store the respective plural candidate sentences or select candidate sentences, from the respective plural candidate sentences and respectively resulting from the plural different translation processes.

A least one memory, of the plural memories, is a non-transitory computer readable medium storing instructions, that when executed by the one or more processors, controls the one or more processors to be configured to perform the plural different translation processes and the selecting of the final sentence.

The at least one processor configured to perform the plural different translation processes and the processor configured to select the final sentence may be the same processor.

In one general aspect, a translation method includes performing plural different translation processes for a source sentence in parallel, wherein the plural translation processes are different with respect to one or more of a corresponding translation encoding process, a corresponding translation decoding process, and whether the corresponding encoding process encodes the source sentence or a variation of the source sentence, and outputting a translation result of the source sentence based on a determined highest ranked candidate sentence respectively resulting from the different translation processes.

A translation decoding processes of at least one of the plural different translation processes may implement an m-best beam search algorithm to determine candidate sentences, with the m-best beam search algorithm being a beam search algorithm with less complexity than an n-best beam search algorithm, with n being greater than m.

In one general aspect, a translation method includes performing plural translation processes for a source sentence in parallel, including first encoding and first decoding the source sentence, differently encoding and/or differently decoding the source sentence, first encoding and first decoding one or more variations of the source sentence, and/or differently encoding and/or differently decoding the one or more variations of the source sentence, where each of the plural translation processes include respective translation encoding and translation decoding processes, to generate a candidate list from each of the translation processes, ranking candidate sentences from each of the candidate lists, and outputting a translation result of the source sentence based on a determined highest ranked candidate sentence based on the ranking, where each of the translation decoding processes implements an n-best beam search algorithm to generate the candidate list for each of the translation processes.

Other features and aspects will be apparent from the following detailed description, the drawings, and the claims.

BRIEF DESCRIPTION OF THE DRAWINGS

FIG. 4 is a diagram illustrating an example of a method of changing a source sentence to be input to at least one translation processor.

Figure 1:
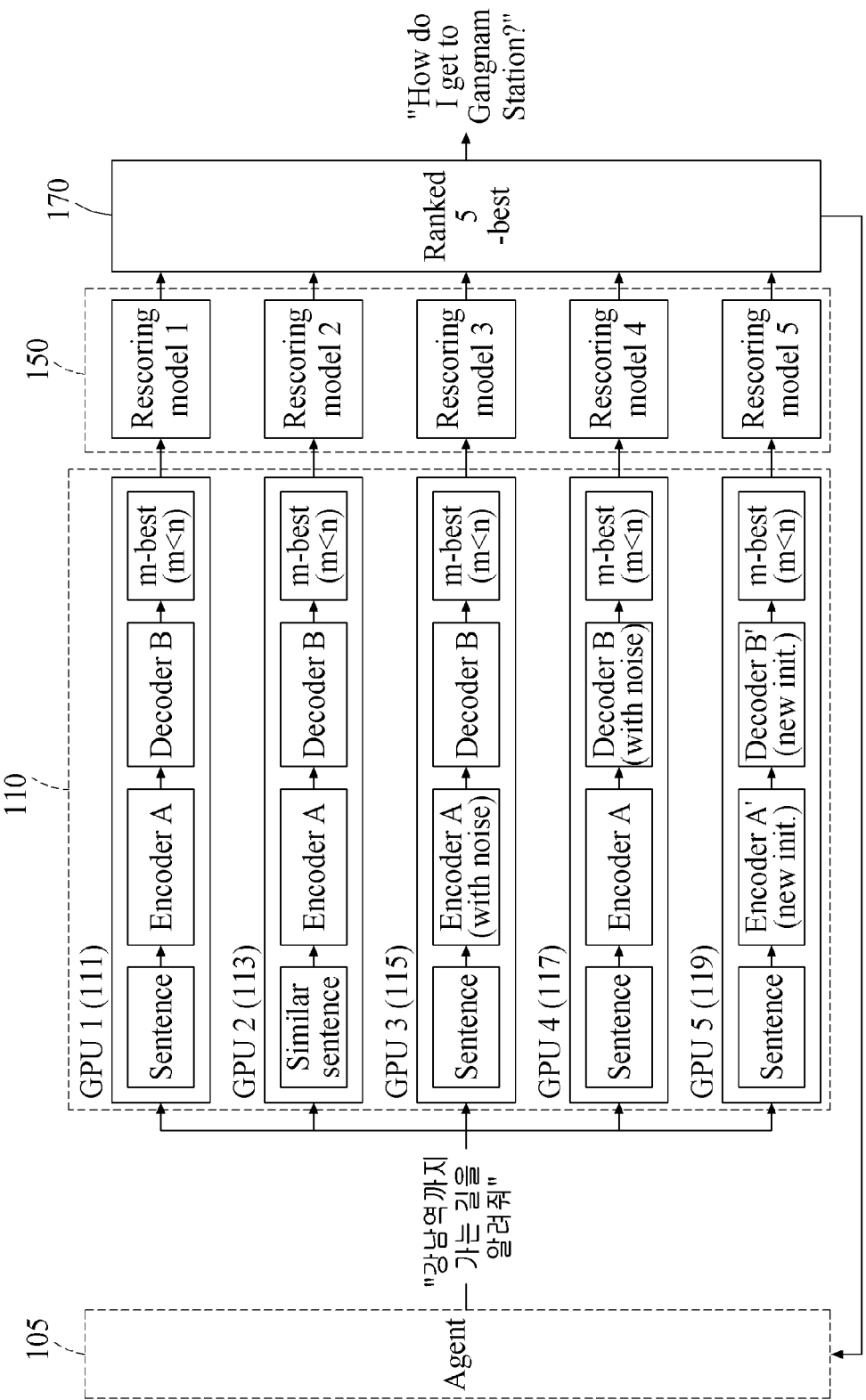
FIG. 1 is a diagram illustrating an example of a configuration of an automated translation apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

The following example embodiments may be applicable to help provide rapid and correct translations in/as an automobile, a television (TV), a mobile phone, and other electronic devices, depending on embodiment. Example embodiments may be embodied as various types of products such as a personal computer (PC), a laptop computer, a tablet computer, a smartphone, smart home appliances, a wearable device, and the like. In examples, embodiments may include non-transitory computer readable media including interpretation application(s), instructions, or software to be executed in/by one or more processors of such a smartphone, mobile device, smart home system, wearable device, and the like embodiments. Example embodiments include a global conferencing hardware, or are configured to provide translated transcription of audio and/or video conferences, such as with subtitles or captions of a video conference with a counterpart, or a corresponding method or non-transitory computer readable media causing one or more processors to be configured to implement the same. Further, example embodiments include providing interpretation services in a private vehicle, a bus, a taxi, corresponding public transports, people movers, and the like for communication between a driver and a passenger of any such vehicle on board who use different languages, or other announcement or public auditory statements, as only examples. Hereinafter, such non-limiting example embodiments will be described in greater detail with reference to the accompanying drawings. Like reference numerals in the drawings denote like elements.

FIG. 1 is a diagram illustrating an example of a configuration of an automated translation apparatus. Referring to FIG. 1, an automated translation apparatus 100 performs automated translation of a first language spoken by a user into a second language. The translation apparatus 100 includes an agent 105, a translator 110, rescoring models 150, and a processor 170. The translator 110 may include plural translation processors 111-119.

In an example, the translation apparatus 100 includes a voice recognizer and a machine translator, such as a deep learning-based machine translator. The voice recognizer converts a voice of a user into a first language sentence, such as the illustrated sentence "강남역까지 가는 길을 알려줘." The machine translator converts the first language sentence into a second language sentence, where the first and second languages are different languages. In FIG. 1, it may be understood that the translator 110, rescoring models 150, and processor 170 correspond to the machine translator and the agent 105 includes the voice recognizer and a controller, where the controller may be configured to control a process of the automated translation. The controller may be alternatively otherwise configured in the translation apparatus, or external of the translation apparatus. The agent 105 may be an intelligent dialog agent, which may refer to computer or processing device hardware that perform recognition and understanding operations of audio information, such as in an intelligent dialog interaction between a user and the agent, or merely computer or processing device hardware that performs speech recognition. The agent 105 may control the output of the results of the recognition by the agent 105 and/or translation results by the processor 170, for example. The performed recognition may include various speech recognition methods of digitized speech, such as through use of either or a combination of an acoustic model, e.g., for phonetics or pronunciation, and a language model, e.g., for connectivity between words or phrases, as only examples. The digitized speech may be derived by an analog to digital converter (ADC) and parser of the agent 105, which may parse input speech into audio frames, which may then be provided to either or both of the example acoustic and/or language models, again noting that the references to such models is by way of example only and embodiments are not limited thereto. In addition to such models indicating a more or most likely recognition for an input audible speech, the models may also respectively indicate probabilities or scores for their respective potential phonetic or word recognitions. A decoder may be used in the agent 105 to correlate the results of the recognition models, such as when either or both of the example acoustic and/or language models (and/or other models) are used, to determine a final recognition of audible speech, for example. In an example, the agent 105 and the translator 110, rescoring models 150, and/or processor 170 may each, or collectively, be implemented through non-transitory computer readable media including one or more instructions or software, through one or more hardware elements, or various combinations thereof.

The user requests the translation apparatus 100 to interpret a voice signal expressed by the first language using the second language. In this example, the voice signal may be a voice signal of the first language. The user may interact with a user interface of the translation apparatus 100 to request the recognition and/or translation, the recondition and translation, or just the translation operations, or the translation apparatus 100 may automatically or continuously operate, e.g., in a background operation of the underlying device, or the user may selectively implement both/either the user interface request and the automatic implementations.

When the voice signal is input to the translation apparatus 100, the agent 105 recognizes the voice signal and generates/outputs a first language sentence of the first language, e.g., the illustrated sentence "강남역까지 가는 길을 알려줘." As noted above, the agent 105 may include hardware to convert the audible voice into a digital signal, for example the agent 105 may include one or more microphones, ADCs, and parsers, or any or any combination of the microphone, ADCs, and parsers may be external of or included elsewhere in the translation apparatus 100. The agent 105 may recognize the voice signal by providing the corresponding audio frames to one or more of the example recognition models of the agent 105, such as the acoustic and/or language models, and by decoding the results of the recognition model(s) as the sentence of the first language. The sentence may be finalized as text-type data, for example. As only examples, the recognition model(s) may be respective trained neural networks. The translation apparatus 100 may further request the translator 110 to begin the processes of respectively translating the recognized sentence using multiple processors of the translator 110. Accordingly, after respective rescorings by the rescoring models 150, the respectively generated translation results in the second language may be provided to processor 170 for a final ranking, for example. The results of the ranking performed by processor 170, e.g., representative of a final translation of sentence voiced in the first language, may then be provided back to the agent 105 for forwarded on for alternate or further processing operations.

The translator 110 may include a plurality of translation processors, for example, a translation processor 111, a translation processor 113, a translation processor 115, a translation processor 117, and a translation processor 119, and one, more than one, or all of such processors may be operated at the same time, i.e., in parallel. As only a non-limiting example, each of the translation processors 111 through 119 may also be configured as respective graphics processing units (GPUs), for example, as GPU 1, GPU 2, GPU 3, GPU 4, and GPU 5, respectively, or parallel processors of one or more graphics processing units. Here, though such respective GPU examples have been provided, embodiments are not limited thereto, as additional and/or alterative processor implementations may be available. In addition, though such GPU or processor examples have been presented, one or more or all of such respective translation operations may be implemented through non-transitory computer readable code or instructions in/on a non-transitory computer readable medium, such as a volatile or non-volatile memory or other medium, to control one or more processors to implement the respective translation operations. For example, though FIG. 1 illustrates an example with separate GPUs 1-5, the translation operations of GPUs 1-3 could be implemented through such implemented non-transitory computer readable code to control one or more processors of the a first GPU and translation operations of GPUs 4-5 could be implemented through such implemented computer code to control another one or more processors of a second GPU, or all translation operations of GPUs 1-5 could be implemented using a same GPU or processor through such implemented non-transitory computer readable code. As another example, the translation apparatus 100 may further include communication or transceiver hardware and a controller, CPU, or any of the utilized GPUs of FIG. 1 that may initiate or control an external implementation of one or more, or all, of the above respective translation operations by an exterior server(s) or processor(s), e.g., as in master-slave or client-server arrangements, such that results of such outsourced translation operations may be made available to, or received by, the translation apparatus 100, e.g., by such communication or transceiver hardware and provided to the processor 170, for example. An example configuration and operation of such a translation processor included in the translator 110 will be described in greater detail further below with reference to FIG. 7.

Figure 11:
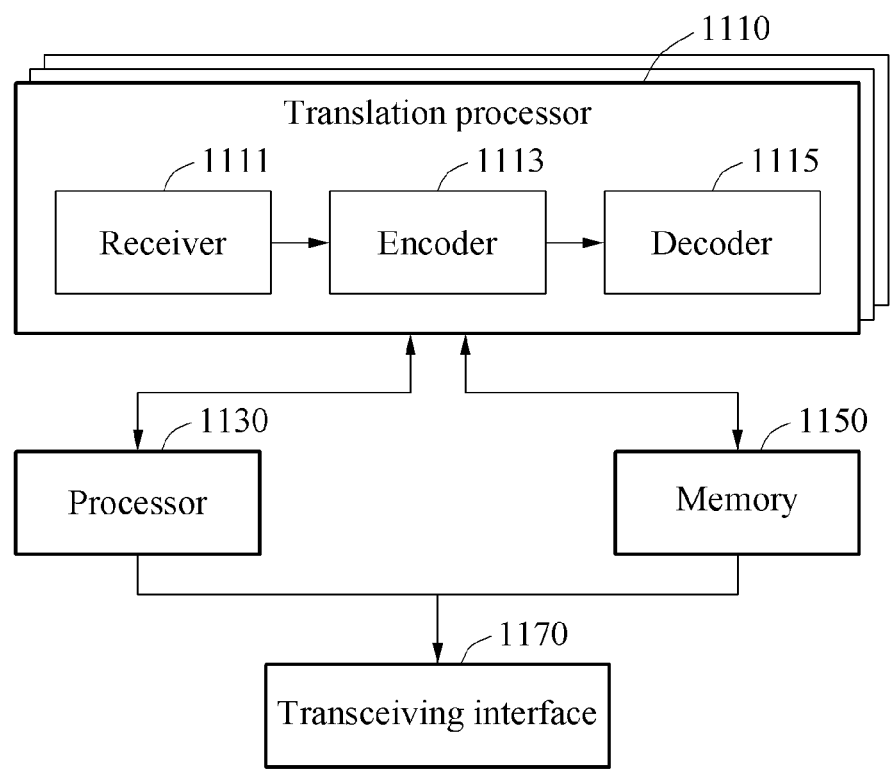
FIG. 11 is a diagram illustrating an example of a configuration of an automated translation apparatus.
Figure 12A:
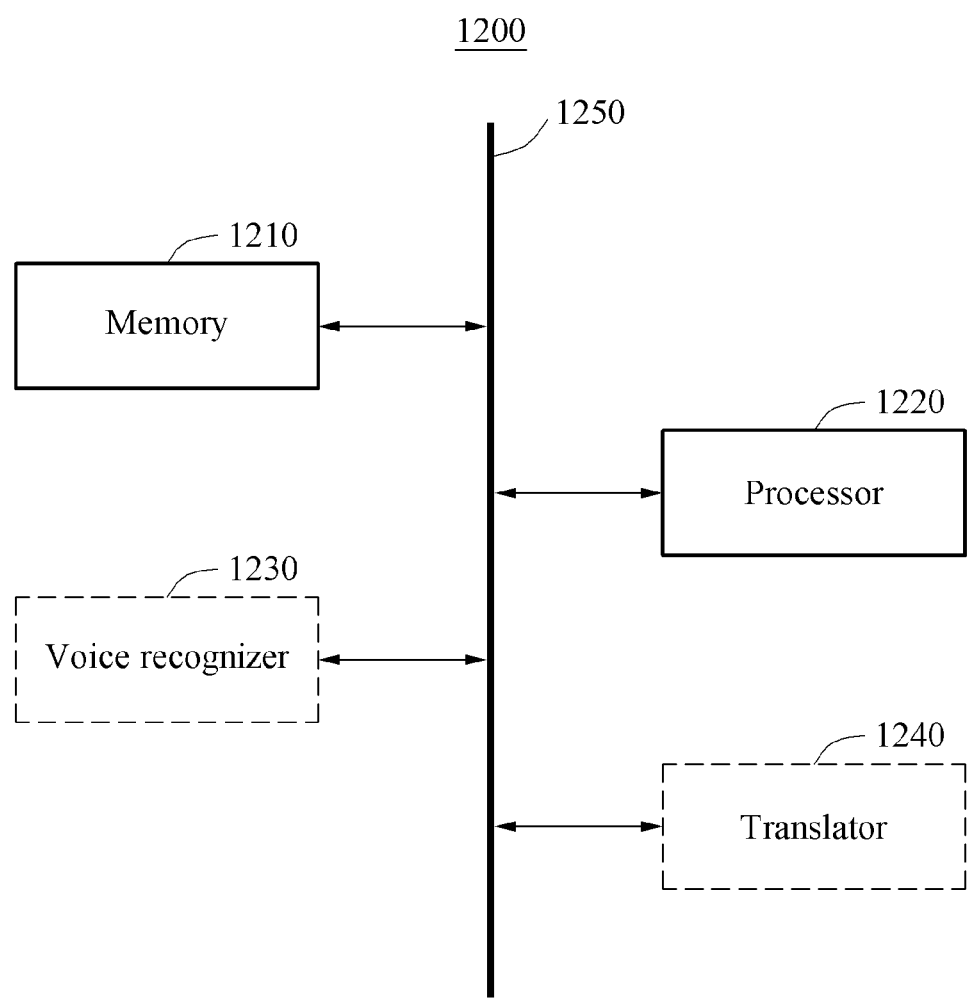
FIGS. 12A and 12B illustrate examples of automated translation apparatuses.
Figure 12B:
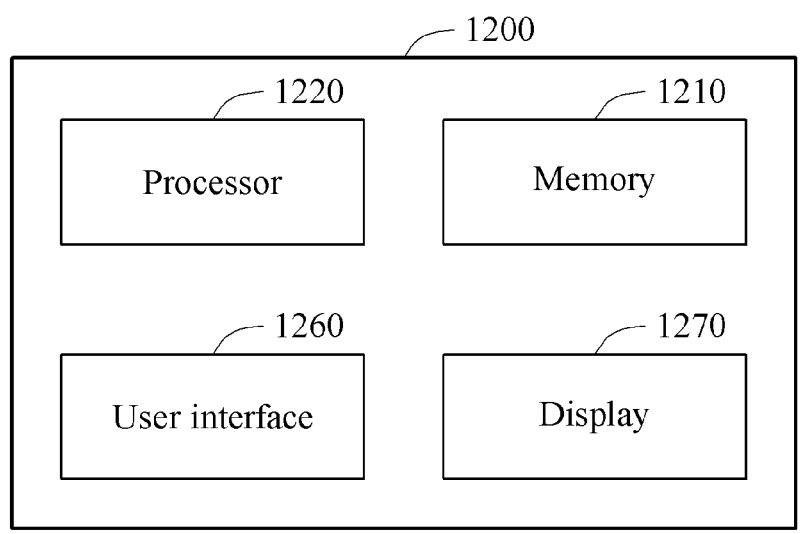

Each of the translation processors 111 through 119 may be configured to perform or include an encoder configured to generate a feature vector by encoding a source sentence in a first language, and a decoder configured to generate candidate sentences in a second language by decoding the respective feature vector into the second language. The encoder and the decoder may each include a neural network or an artificial neural network, which may also both be pretrained. Each of translation processors 111-119 are also representative of one or more memories, such as cache to store processing results of the encoder and decoder and the neural network(s) or artificial neural network(s). The neural networks or artificial neural networks may also be trained and/or upgradable or updated through the communication or transceiver hardware of the translation apparatus 100, such as illustrated in FIGS. 11-12B. A structure of an example of the neural network that may be included in the encoder and the decoder will be described in greater detail below with reference to FIGS. 8 through 10.

Before initiating translation, the translation apparatus 100 may provide (or copies) the source sentence in the first language, for example, "강남역까지 가는 길을 알려줘," to each of the translation processors 111 through 119. The source sentence may be provided to each of the translation processors 111 through 119 at the same time, e.g., in parallel, or according to a particular sequence. For example, the particular sequence could be designed based on the respective expected processing times of each of the translation processors 111 through 119, such as so the respective results are provided, or made available, to processor 170 at or near the same time. The respective encoders included in each of the translation processors 111 through 119 convert the input source sentences to respective feature vectors, which may be in the form of respective abstracted sentence information, e.g., separated or extracted phoneme, morpheme, syntax, sentence, and/or context information from or regarding the input source sentence. The respective decoders receiving the corresponding feature vector from the corresponding encoder generate the corresponding candidate sentences in the second language as respective output translation results for the corresponding translation processor. Each decoder may, thus, generate an m-best list including m candidate sentences in the second language using an m-best beam search algorithm, for example. Here, m indicates a complexity of the beam search algorithm.

In an example, the number of candidate sentences to be generated through a general or typical n-best beam search algorithm is n, where all (n) word sequences, for example, within the set or specified beam are found. In the decoder generated m-best beam search algorithm, according to one or more embodiments, a value of m is less than a value of n, so less than all available results within the specified beam are returned as a result of the n-best beam search algorithm. Using such a beam search algorithm according to one or more embodiments with the m complexity, less than an n complexity of the typical n-best beam search algorithm, an operation (or calculation) complexity of the decoder included in each of the translation processors 111 through 119 may be reduced. However, though the operation complexity of the decoder may be reduced over a decoder that may implement the n-best beam search algorithm, a decoding performance of such an m-best beam search algorithm may be less to the decoding performance of the n-best beam search algorithm, and thus, in one or more embodiments a plurality of translation processors operating in parallel may be used to minimize this decrease in decoding performance when the m-best beam search algorithm is implemented. For example, parallel processing using a plurality of GPUs respectively represented in the example translation processors 111 through 119 may help ensure a performance that is sufficiently close or practically the same as a performance of a general single translation processor that performs the example n-best beam search algorithm, while potentially actually improving the overall translation speed of the source sentence over such a single translation processor performing the typical n-best beam search algorithm.

Alternatively, the parallel processing using the GPUs may ensure a translation speed that is practically the same as a translation speed of a general single translator, and also improve a performance in translation. For example, when one or more or all of the decoders respectively included the translation processors 111 through 119 implements the n complexity of the beam search algorithm, i.e., the n-best beam search algorithm, a performance in translation may be improved due to an increase in the number of candidate sentences through the parallel processing, although the overall translation speed may not be significantly changed or improved over a single translation process that performs the n-best beam search algorithm. Thus, a translator having a desired translation speed and/or performance may be embodied by selecting or adjusting a complexity of the beam search algorithm that is to be used in one or more of the decoders included in the respective translation processors 111 through 119, as well as the number of the translation processors 111 through 119, and thus determine which of the translation processors 111 through 119 to implement or how to differently implement any of the same translation processors based on a varied or changed aspects of the source/first language sentence, the translation encoding operation, the translation decoding operation, and/or which of the m or n-best beam search algorithm (or other search algorithm) is implemented. In an example, a select one or more of the translation processors 111 through 119 may implement an n-best beam search algorithm, while the remaining translation processors implement the example m-best beam search algorithm, so the translation apparatus 100 may at one time select to implement only translation processors that implement m-best beam search algorithms, while at another time the translation apparatus may implement translation processors that implement both the m-best beam search algorithms and the n-best beam search algorithm. Regardless, depending on which translation processors are implemented, their corresponding resulting highest scoring final candidate sentence(s) may be determined by the corresponding rescoring models and provided/indicated to the processor 170, which may then rank those respectively provided final candidate sentences to determine the final translation of the source first language sentence.

For convenience of description, examples of using a beam search algorithm with a reduced complexity by the decoder included in each of the translation processors 111 through 119 will be described hereinafter, e.g., with the example respectively illustrated m-best results shown with the translation processors 111 through 119 of FIG. 1. However, as noted above, an example of using another decoding algorithm in lieu of the beam search algorithm may also be available, depending on embodiment.

To prevent the decrease in decoding performance through the parallel processing using the translation processors 111 through 119, it may be desirable to obtain variety in m-best candidate sentences to be extracted from the translation processors 111 through 119. The translation apparatus 100 may change at least one of the source sentence to be input to at least one of the translation processors 111 through 119, an encoder included in the at least one translation processor, or a decoder included in the at least one translation processor. The translation apparatus 100 may ensure the variety in the candidate sentences in the second language by changing the source sentence, the encoder, decoder, or various combinations thereof.

For example, the translation apparatus 100 may input the source sentence in the first language to the GPU 1, and input a variation of the source sentence in the first language to the GPU 2 by changing the source sentence to another sentence or a similar sentence having the same meaning as the source sentence, or alternatively the source sentence in the first language may be provided to the GPU 2 and the GPU 2 may change the source sentence. An example method of changing a source sentence by a translation apparatus 100 will be described in greater detail further below with reference to FIG. 4.

In the current example, the translation apparatus 100 may vary or change operation of the encoder by applying noise to a parameter value or an activation function to be applied to, for example, the encoder of the GPU 3. The translation apparatus 100 may also, or alternatively, vary or change operation of the decoder by applying noise to a parameter value or an activation function to be applied to, for example, the decoder of the GPU 4. In addition, the translation apparatus 100 may vary noise to be applied to the parameter value or the activation function to be respectively applied to an encoder and decoder of a same translation process. For example, the parameter value may be a weight of a synapse included in a corresponding neural network, e.g., of the encoder or the decoder of GPU 4, and the activation function may be a function indicating activation characteristics of a node included in the corresponding neural network.

For another example, the translation apparatus 100 may replace the illustrated encoder A with an encoder A' trained by a previous varying or changing of at least one of an initial training value, a training set, or a training sequence, and/or replace the illustrated decoder B with a decoder B' trained by a previous varying or changing at least one of an initial training value, a training set, or a training sequence. Here, the replacing of the encoders or decoders may be implemented by the GPU 1, for example, selecting from among available encoders or decoders, or by selectively implementing translation operations of the translation processor, such as GPU 5, that includes the alternately trained encoder and/or decoder. For example, with parallel processing, the translation operations of GPU 1 with encoder A and decoder B may be implemented in parallel with the translation operations of GPU 5 with encoder A' and decoder B', with encoder A and decoder B', or with encoder A' and decoder B. Multiple encoders and/or multiple decoders within the translation apparatus 100 may be referred to part of a translation system of the translation apparatus 100. As noted above, the respective encoders or decoders of such a translation system may be included in separate processors or collectively or differently collectively arranged within/by one or more processors of the translation apparatus 100.

In another example, the translation apparatus 100 may use another translator 110 already provided or available with such changes or modifications having been previously applied to at least one of the translation processors therein, instead of adaptively changing or selecting any of the translation processors 111 through 119.

In an example, a translation speed may be improved by parallelizing a plurality of translation processors or operations, and accuracy in translation may also be improved by generating various candidate sentences in a second language, e.g., separately found m-best candidate sentences in the second language by each of translation processors or operations, by respectively varying or changing a source sentence, an encoder aspect, a decoder aspect, and various combinations thereof.

Although an example of using, in parallel, five translation processors are described with reference to FIG. 1, examples are not limited thereto and various numbers of translation processors may be used.

As illustrated in FIG. 1, depending on embodiment, the translation apparatus 100 separately includes rescoring models 150 or the rescoring models 150 are respectively included in the translation processors 111 through 119. The rescoring models 150 are configured to respectively determine a ranking of the example m-best or n-best candidate sentences in the second language based on scores, or respectively recalculate scores of the m-best or n-best candidate sentences in the second language. In an example, each of the rescoring models 150 may output a respective single 1-best candidate sentence to the processor 170, as a final candidate sentence for each translation processor or translation operation.

The respective rescoring models 150 may determine scores obtained while respectively decoding the corresponding candidate sentences in the second language to be scores of the corresponding candidate sentences in the second language. For example, a score of a candidate sentence identified by GPU 1 in the second language may be a value of a probability of how that candidate sentence corresponds to the source sentence. In such an example, the respective rescoring models 150 may also be referred to as ranking models.

In addition, the translation apparatus 100 further includes a processor 170. The processor 170 selects a candidate sentence corresponding to a final result of the translation based on the candidate sentences in the second language to be received from the rescoring models 150.

The processor 170 may select, as a final sentence, a candidate sentence, for example, "How do I get to Gangnam Station?," having a highest score among the final candidate sentences in the second language, from all of the rescoring models 150, based on respective scores corresponding to each of the final candidate sentences in the second language that are calculated by the rescoring models 150, and output the selected final sentence.

The selected final sentence in the second language may be provided to the agent 105, which may then transfer the final translation result to the user. The agent 105 may provide the final translation result to the user in a form of text in the second language, such as through a display of the translation apparatus 100. In an example, the agent 105 may provide the final translation result to the user audibly through a voice synthetization process of the agent 105 and a speaker of the translation apparatus 100. For example, the agent 105 may provide the final translation result to the user in a form of voice in the second language based on text to speech (TTS) technology of the agent 105.

Depending on embodiment, interaction with the agent 105 and initiation of translation operations may each be implemented in or through a user terminal or in a server, such as a remote server. The agent 105 and the translator 110, rescoring models 150, and processor 170 may operate in the user terminal such as a smartphone, as only an example. The agent 105 and the translator 110, rescoring models 150, and processor 170 may also or alternatively operate in the server, such as by receiving either voice recordings of speech or audio frames from a remote terminal. The server implementation may also include an agent 105 at a local device with, or without, one or more translation processors and with the corresponding rescoring model also in the local device or remote from the remote device, and the processor resident on a remote server, in which case the remote server may then communicate with the local device to provide the final results of the translation to agent 105, which may provide the same to the user or implement other operations. The foregoing are merely examples and thus, various changes are available thereto. For example, a controller included in the agent 105 may operate in the user terminal and a voice recognizer and the translator 110, rescoring models 150, and processor 170 may be, and operate in, the server. In addition, while operations may be discussed as being performed by the agent 105 or operations may be discussed as being performed by the translator 110, rescoring models 150, and processor 170, the controller of the agent 105 may control such operations to be performed by each of the agent 105 and the translator 110, rescoring models 150, and processor 170 and control receipt and transmission of information therebetween. Alternatively, the controller may be included in the translator 110, be represented by processor 170, or any or all of the agent 105, the translator 110, and processor 170 may respectively include controllers that respectively control each of the agent 105 and operations of the translator 110, rescoring models 150, and processor 170 and transmit results of the above operations therebetween, as only examples.

Figure 2:
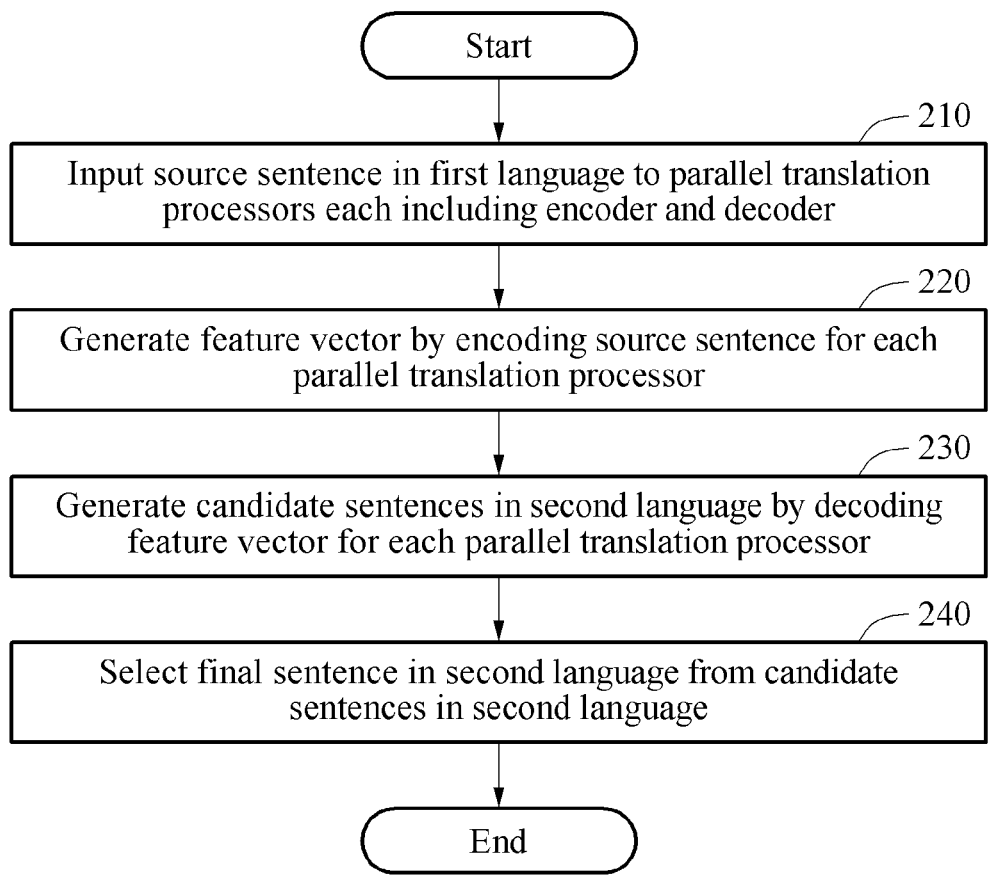
FIG. 2 is a flowchart illustrating an example of a translation method.

FIG. 2 is a flowchart illustrating an example of an automated translation method. Referring to FIG. 2, in operation 210, an automated translation apparatus inputs a source sentence in a first language to a plurality of translation processors each including an encoder and a decoder. An example structure and operation of such a translation processor will be described in greater detail further below with reference to FIG. 7.

In operation 220, the translation apparatus generates respective feature vectors by encoding the source sentence for each translation processor. The feature vector may also be referred to as abstract sentence information. The translation apparatus may convert the input source sentence to the feature vectors through the respective encoding operations. For example, when a source sentence, for example, "안녕하세요," is input, the translation apparatus may generate abstract sentence information, for example, 3.432, 4.742, . . . , 0.299, which is an example feature vector.

In operation 230, the translation apparatus generates candidate sentences in a second language by decoding the feature vector for each translation processor. The translation apparatus may generate a preset number of candidate sentences, for example, m candidate sentences, for each translation processor using, for example, an m-best beam search algorithm.

The translation apparatus may output respective candidate sentence lists corresponding to the abstract sentence information using the respective beam search algorithms. The translation apparatus may generate such a candidate sentence list, or a list of the candidate sentences, corresponding to the abstract sentence information, for example, 3.432, 4.742, . . . , 0.299, using the example m-best beam search algorithm. For example, a candidate sentence list may include the candidate sentences, for example, "Hello," "How are you?," . . . , "How are you doing?."

Here, when a less number of candidate sentences is generated by the translation apparatus, such as when the m-best beam search algorithm is implemented, the translation apparatus may generate an incorrect result in translation although the translation apparatus may perform the translation relatively rapidly. Conversely, when a greater number of candidate sentences are generated by the translation apparatus, such as through the n-best beam search algorithm, the translation apparatus may perform the translation relatively slowly although the translation apparatus may generate a relatively correct result in the translation. In an example, using a plurality of translation processors, the number of candidate sentences to be generated by one translation processor may be reduced, and thus a processing speed may be improved. Further, by generating various candidate sentences through variations or changes between the translation processors, accuracy in the translation may also be improved. An example method of generating various candidate sentences by varying or changing the translation processors or operations thereof will be described in greater detail further below with reference to FIG. 3.

In operation 240, each translation operation of the translation apparatus selects a final candidate sentence in the second language from the candidate sentences in the second language. For example, the translation apparatus may select, as the final candidate sentence in the second language, a sentence having a highest probability, for example, "How are you doing?," from the candidate sentence list including the candidate sentences, for example, "Hello," "How are you?," and "How are you doing?," using a rescoring model. Then, all final candidate sentences may be considered and a final sentence with a highest ranking selected. An example method of selecting the final sentence in the second language using rescoring models will be described in greater detail further below with reference to FIGS. 5 and 6.

Figure 3:
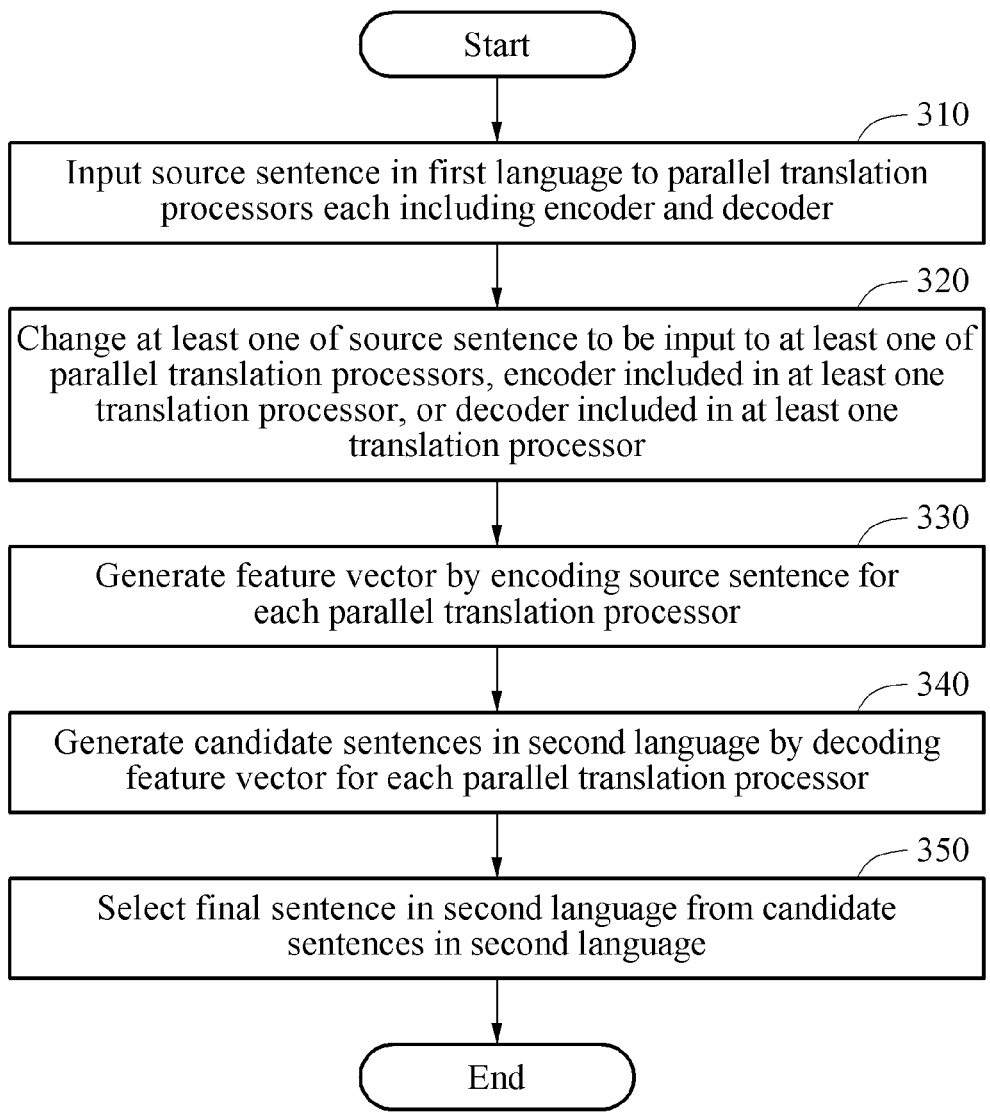
FIG. 3 is a flowchart illustrating an example of a translation method.

FIG. 3 is a flowchart illustrating another example of a translation method. Referring to FIG. 3, operations 310, 330, 340, and 350 correspond to operations 210, 220, 230, and 240, respectively, and thus a repeated description will be omitted here.

In operation 320, the translation apparatus varies or changes at least one of the source sentence to be input to at least one of translation processors, the source sentence after input to the at least one of the translation processors, the corresponding encoder included in the at least one translation processor, and/or the corresponding decoder included in the at least one translation processor. In addition, in an example where multiple translation operations are performed with a same varied or changed source sentence, e.g., where aspects of the corresponding encoder, decoder, or search algorithm are alternatively or additionally changed, the same varied or changed source sentence may be provide to the corresponding multiple translation processors or read from a same memory for the corresponding translation operations. Similarly, as only an example, whether the source sentence or the varied or changed source sentence, if the same sentence is input or made available to multiple translation processors or used in the multiple translation operations where the encoders are the same between the translation processors or encoding operations are the same between the translation operations, then results, such as abstracted sentence information in vector form, of only one of the such encoders or encoding operations may be provided or made available to the differing decoders across the multiple translation processors or used in, or accessed by, the differing decoding operations across the multiple translation operations, so encoding may not necessarily be implemented in all translation processors for which translation operations are implemented, for example.

An example method of varying or changing, e.g., by the translation apparatus, the encoder and/or the decoder included in the at least one translation processor is as follows.

The translation apparatus may vary or change the encoder or operation of the encoder, or include a different translation processor with a different encoder with different aspects, by applying noise to a parameter value or an activation function to be applied to the encoder included in the at least one translation processor. The parameter value may be a parameter or a weight of the encoder including a corresponding neural network. When the encoder and the decoder include a neural network or respective neural networks, a process of training the encoder and the decoder may be performed in advance. The training of the encoder and the decoder may be construed as determining a parameter or a weight included in the neural network.

For example, the translation apparatus may generate noise to be applied to such a determined weight based on a probability distribution of weights and apply the generated noise. Alternatively, the translation apparatus may generate noise to be applied to an activation function based on a probability distribution of activation functions.

Similarly, the translation apparatus may vary or change the decoder or operation of the decoder, or include a different translation processor with a different decoder with different aspects, by applying noise to a parameter value or an activation function to be applied to the decoder included in the at least one translation processor.

In addition, the translation apparatus may vary or change the encoder by replacing the encoder included in the at least one translation processor with an encoder trained by a different at least one of an initial training value, a training set, or a training sequence, or by including an additional translation processor with such differently trained encoder. Similarly, the translation apparatus may vary or change the decoder by replacing the decoder included in the translation processor with a decoder trained by a different at least one of an initial training value, a training set, or a training sequence, or by including the additional translation processor or still another translation processor with such differently trained decoder.

FIG. 4 is a diagram illustrating an example of a method of varying or changing a source sentence to be input to at least one translation processor. Referring to FIG. 4, an automated translation apparatus may change a word order of a source sentence to be input to at least one translation processor based on information associated with a first language. The information associated with the first language may be stored in, for example, a language model. For example, in an embodiment, the language model may be a same language model used in/by a recognizer that implements the language model to audibly recognize the source sentence, e.g., using the example acoustic model and the language model for recognition.

In this example, the source sentence is assumed herein to be "강남역까지 가는 길을 알려줘."

The translation apparatus may change the source sentence by changing a word order of the source sentence to, for example, "가는 길을 알려줘, 강남역까지," "알려줘! 강남역까지 가는 길을," "알려줘, 가는 길을, 강남역까지." The translation apparatus may change the source sentence by dividing the source sentence by a word unit or a sub-word unit, and changing a word order of sub-words. Although an example of using a sub-word will be described hereinafter, an example of using a word in lieu of a sub-word may also be applicable.

The translation apparatus may replace, with a synonym or a similar word, a word included in the source sentence to be input to the at least one translation processor based on the information associated with the first language. The information associated with the first language may include a synonym dictionary, or a thesaurus, as only examples.

For example, the word to be replaced by the synonym may be one of a sub-word and a word. A sub-word used herein may be construed as being a sequence of characters frequently used in a general sentence.

The translation apparatus may search the thesaurus for corresponding synonyms for, for example, "~까지," "알려줘," and "가는 길을 알려줘," and then retrieve the synonyms, for example, "~으로" for "~까지," "알려주세요," "어떻게 됩니까," and "알려주시겠습니까?," for "알려줘," and "어떻게 가죠?" and "어떻게 가나요?" for "가는 길을 알려줘." The translation apparatus may change the source sentence to various sentences as illustrated in FIG. 4 by replacing a word included in the source sentence with a retrieved synonym.

Figure 5:
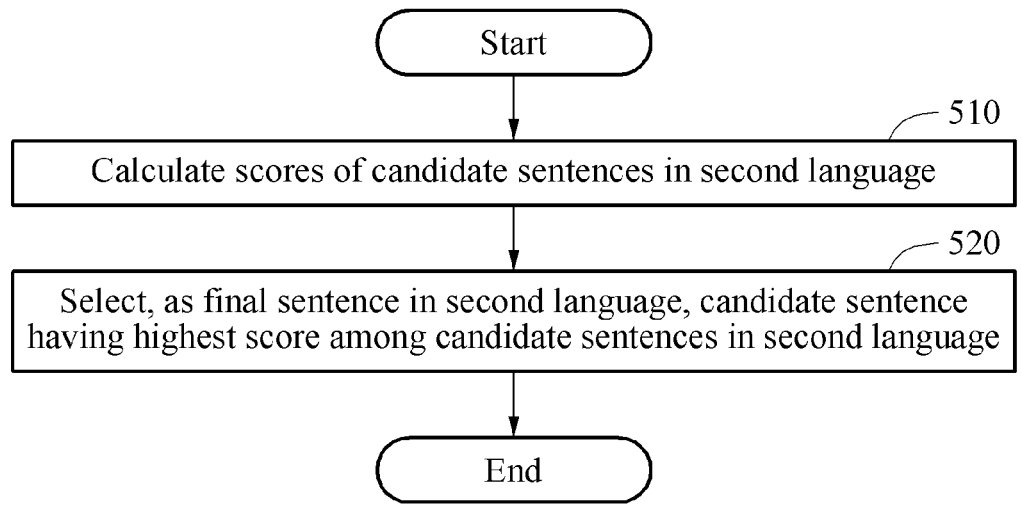
FIG. 5 is a flowchart illustrating an example of a method of calculating scores of candidate sentences and selecting a final sentence in a second language.

FIG. 5 is a flowchart illustrating an example of a method of calculating scores of candidate sentences and selecting a final sentence in a second language. Referring to FIG. 5, in operation 510, an automated translation apparatus calculates scores of respective candidate sentences in a second language. The translation apparatus may calculate the scores of the respective candidate sentences in the second language for each translation processor. Here, a score of a candidate sentence may be a probability or confidence value corresponding to the candidate sentence. The translation apparatus may use probability values calculated for each candidate sentence in a decoding process of the corresponding translation operation, and may then recalculate a score of each candidate sentence using a new rescoring model, such as by using a corresponding one of the rescoring models 150 of FIG. 1.

In operation 520, the translation apparatus selects, as a final sentence in the second language, one of the candidate sentences that has a highest score among the candidate sentences in the second language based on the scores calculated in operation 510. In an example, for each implemented translation processor or translation operation, a corresponding one or more final candidate sentences may be selected that have highest respective recalculated scores, such as for provision to the processor 170 of FIG. 1, and where the processor 170 selects therefrom for the final sentence as the translation of the original source sentence. Alternatively, all of the candidate sentences that have been rescored by one or more or all of the corresponding rescoring models may be provided or indicated to the example processor 170, e.g., as results of such respective rescoring models, and the processor 170 may select a highest scoring candidate sentence from all candidate sentences as the final sentence as the translation of the original source sentence. Though examples have been provided, embodiments are not limited thereto, and combinations of the same are also available as well as other examples. For example, rather than candidate sentences being provided as outputs of the respective decoders or rescoring models, the corresponding scores may be output with an identification or reference to the underlying candidate sentence that each score corresponds to, so the processor 170, for example, may merely select a highest recalculated score and, upon identifying the corresponding candidate sentence, output that sentence as the final candidate sentence.

Figure 6:
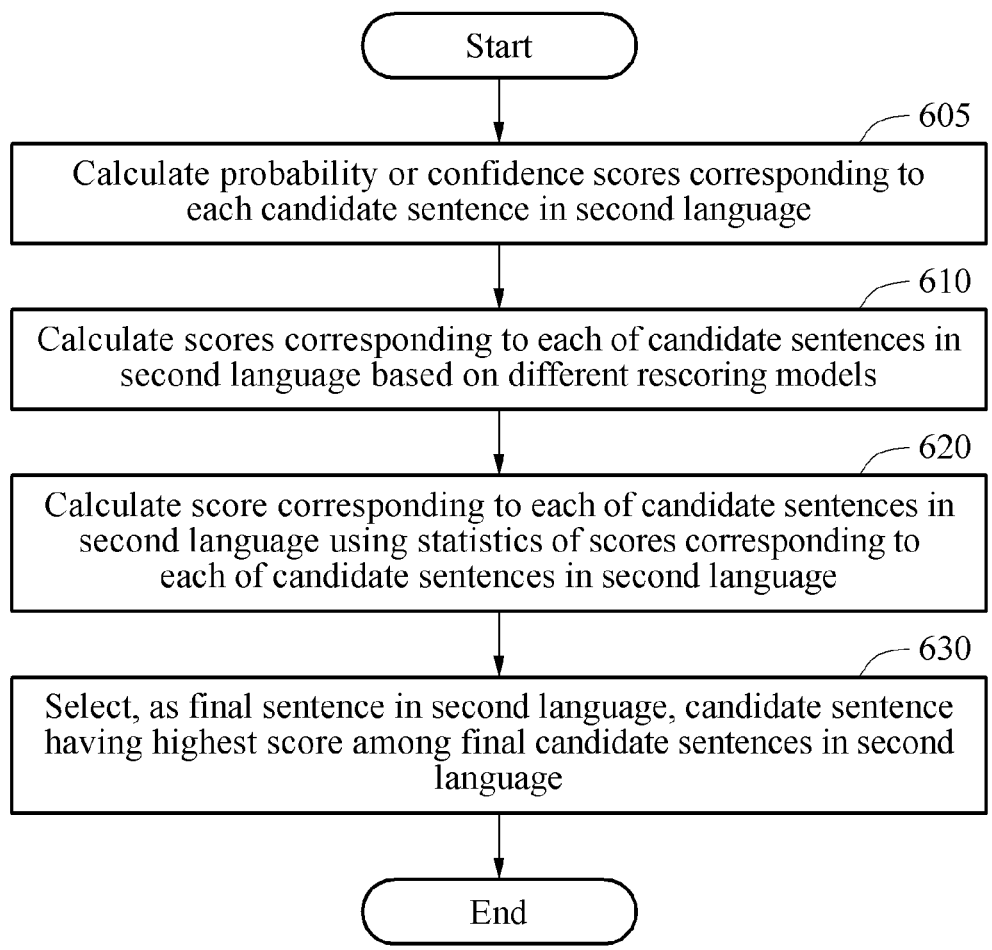
FIG. 6 is a flowchart illustrating an example of a method of calculating scores of candidate sentences and selecting a final sentence in a second language.

FIG. 6 is a flowchart illustrating an example of a method of calculating scores of candidate sentences and selecting a final sentence in a second language. Referring to FIG. 6, in operation 605, an automated translation apparatus calculates scores of respective candidate sentences in a second language. The translation apparatus may calculate the scores of the respective candidate sentences in the second language for each translation processor. Here, a score of a candidate sentence may be a probability or confidence value corresponding to the candidate sentence.

In operation 610, the translation apparatus may recalculate a plurality of scores corresponding to each of candidate sentences in a second language respectively based on a plurality of different rescoring models. In an example, the translation apparatus may use, in parallel, the different rescoring models. By calculating the scores of each of the different translation processors or translation operations using the corresponding rescoring models in parallel and using a mean value of the scores, accuracy in translation may be improved without a loss in terms of a translation speed.

For example, in operation 620, the translation apparatus recalculates a score corresponding to each of the candidate sentences in the second language using statistics of the scores corresponding to each of the candidate sentences, for example, the mean value and a standard deviation. In an example, a select number of final candidate sentences in the second language are selected for further consideration based on the results of each of the respective rescoring models in operation 610, and scores of those select final candidate sentences are thus recalculated in operation 620 using such statistics of these scores before a final sentence is selected in operation 630. For example, such statistic rescoring may be performed by respective rescoring models of the different translation processes, e.g., of the respective translation processors, when such statistic information from among the rescoring models is shared between the rescoring models. Alternatively, the statistic score recalculation may be performed after completion of the operations of the rescoring models, such as by the processor 170 of FIG. 1, where such additional statistical score recalculation is performed by the processor 170, e.g., from among final candidate sentences that are provided or indicated to the processor 170 from the respective rescoring models, and based on statistical information determined by the processor 170 or provided to the processor 170 from the respective rescoring models, for final consideration in operation 630 to select the final sentence.

In operation 630, the translation apparatus selects one of the final candidate sentences that has a highest recalculated score in operation 620 as a final sentence as the translation of the original source sentence.

Figure 7:
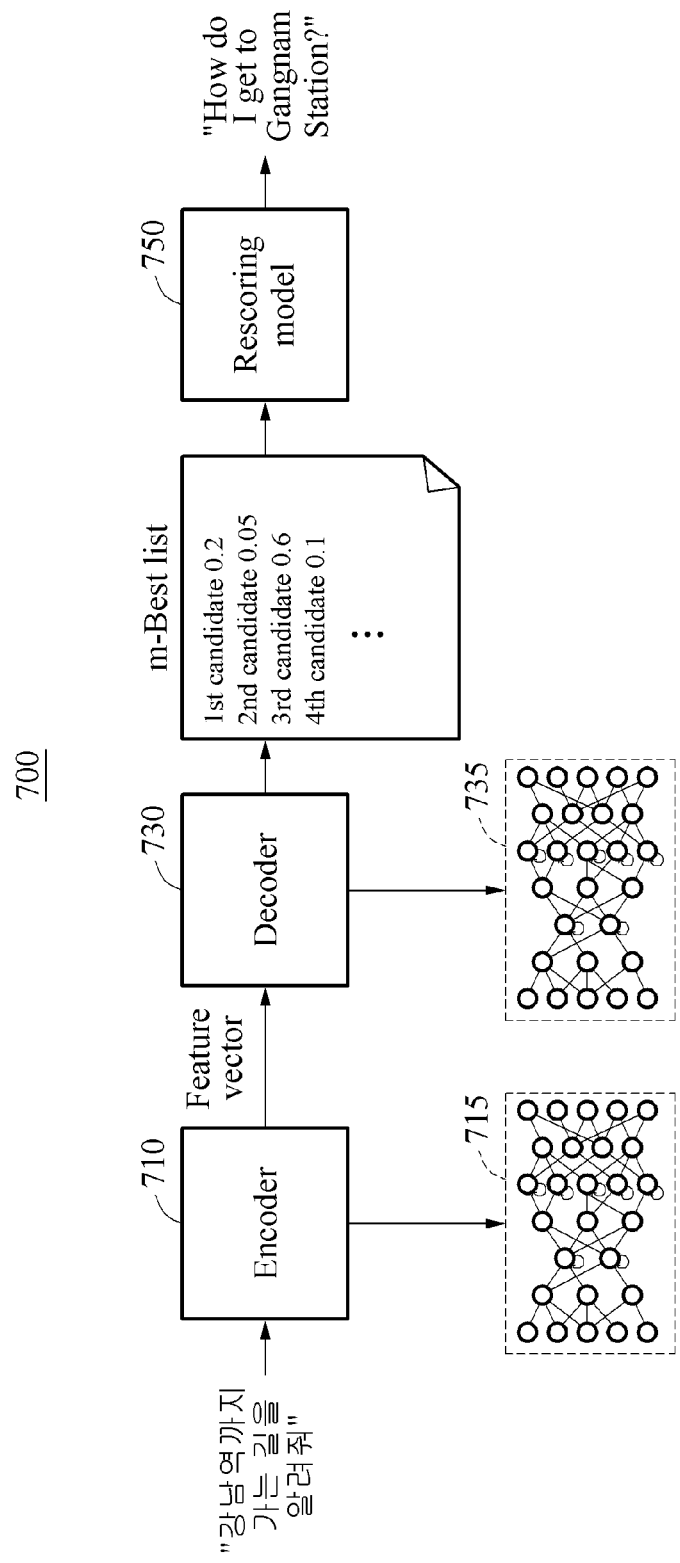
FIG. 7 is a diagram illustrating an example of a configuration and an operation of a translation processor.

FIG. 7 is a diagram illustrating an example of a configuration and an operation of a translation processor, such as any of translation processors 111-119 of FIG. 1, as only examples. Referring to FIG. 7, a translation processor 700 includes an encoder 710, a decoder 730, and a rescoring model 750.

For example, when a source sentence "강남역까지 가는 길을 알려줘" in a first language is input to the translation processor 700, the translation processor 700 may divide the source sentence into sub-words, for example, "강남," "역," "까지," "가는," "길," "을," "알려," and "줘," and sequentially input the sub-words to the encoder 710.

When the entire source sentence is input, the encoder 710 may generate a feature vector by encoding the source sentence. As described above, before inputting the source sentence to the encoder 710, the translation processor 700 may change the source sentence by changing a word order of the source sentence or replacing a word or a sub-word included in the source sentence with a synonym. The translation processor 700 may input the changed source sentence in the first language to the encoder 710. Alternatively, a translation apparatus in which the translation processor 700 is included may perform the changing of the source sentence prior to inputting the changed source sentence to the translation processor 700, and the encoder 710 of the translation processor 700.

The encoder 710 may include a neural network 715. An example structure and operation of the neural network 715 will be described in greater detail further below with reference to FIG. 8.

The encoder 710 may generate the feature vector by encoding the source sentence in the first language by the neural network 715. The encoder 710 may generate the feature vector, for example, 2.542, 0.827, and 5.936, for a single source sentence, for example, the source sentence "강남역까지 가는 길을 알려줘."

The decoder 730 may generate candidate sentences in a second language by decoding the feature vector generated by the encoder 710. The decoder 730 may generate a list of the candidate sentences in the second language, for example, an m-best list, using, for example, an m-best beam search algorithm. The list of the candidate sentences in the second language may include candidate sentences, for example, "How do I get to Gangnam?," "Please let me know the way to Gangnam Station," "How do I get to Gangnam Station?," and "I'll go to Gangnam Station." Here, each of the candidate sentences may be assigned a determined score, or probability or confidence value, corresponding to each of the candidate sentences, for example, 0.2, 0.05, 0.6, and 0.1. Each of the candidate sentences may be output from the decoder 730 by a sub-word unit of the second language.

As only an example, an input dimension of the encoder 710 may be a dimension of a dictionary including sub-words of the first language, and an output dimension of the decoder 730 may be a dimension of a dictionary including sub-words of the second language. Here, a dimension of a dictionary may be the number of sub-words included in the dictionary.

The rescoring model 750 may arrange the candidate sentences according to their determined scores. The rescoring model 750 may arrange the scores corresponding respectively to the candidate sentences by a preset number of scores in an order starting with the candidate sentence with a highest score to the preset number candidate sentence. The translation processor 700 may select, as a final candidate sentence in the second language for the translation processor 700, the candidate sentence "How do I get to Gangnam Station?," corresponding to the highest score among the preset number of scores arranged by the rescoring model 750.

For example, the rescoring model 750 may select the final candidate sentence using a mean value of a probability that an original sentence of each of the candidate sentences is to be translated into a translated sentence and a probability that the translated sentence is to be translated into the original sentence.

Figure 8:
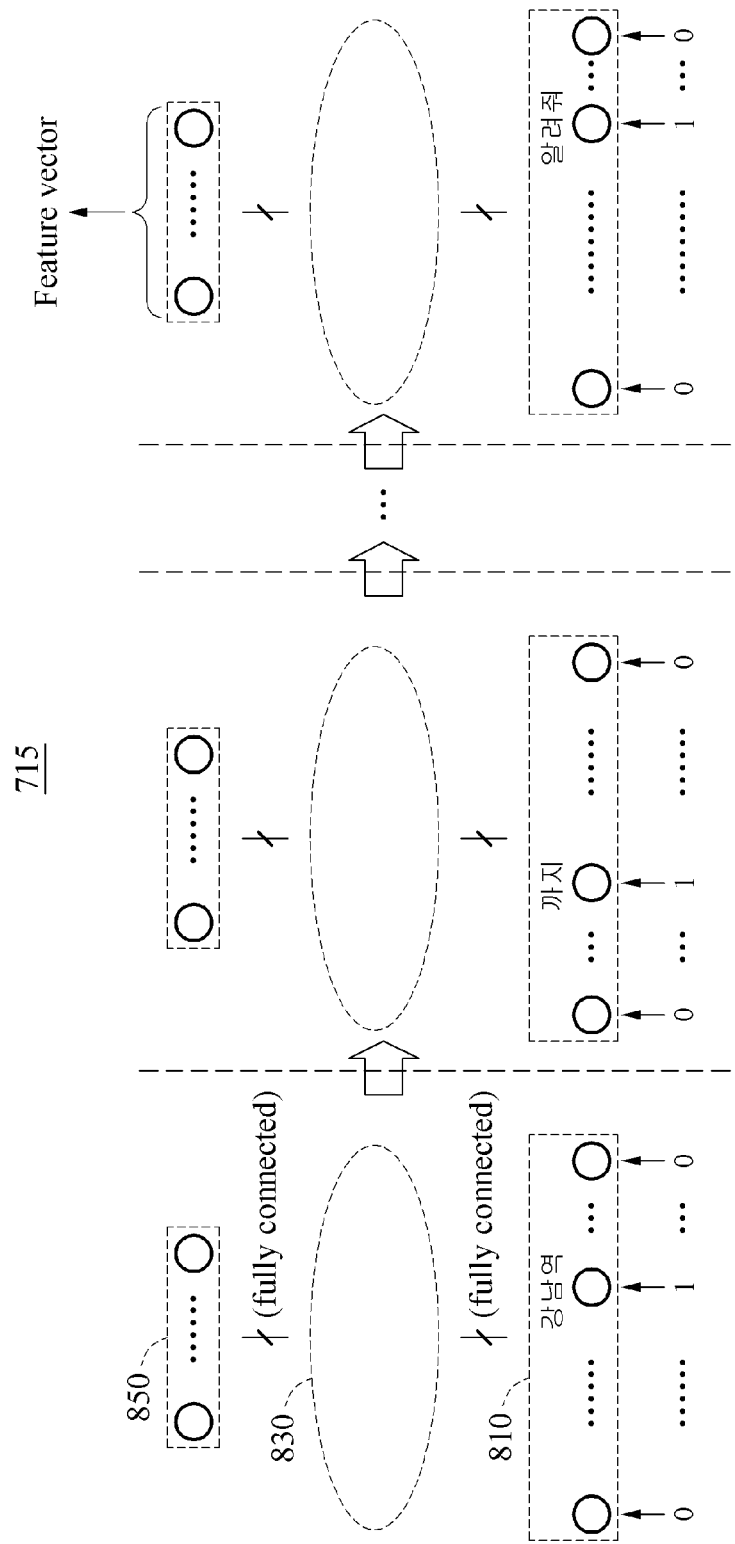
FIG. 8 is a diagram illustrating an example of a structure and an operation of a neural network included in a translation encoder.

FIG. 8 is a diagram illustrating an example of a structure and an operation of a neural network, such as neural network 715 included in the encoder 710 of FIG. 7, as only an example. Referring to FIG. 8, the example neural network 715 includes an input layer 810, a hidden layer 830, and an output layer 850.

A dimension of the input layer 810 may correspond to a dimension of a sub-word in a first language. The first language may be input to the input layer 810 by a sub-word unit in a form of a one-hot vector. For example, when a first sub-word to be input to the encoder 710 is "강남역," 1 may be input to a node corresponding to "강남역" among a plurality of nodes of the input layer 810, and 0 may be input to a remaining node of the input layer 810. A one-hot vector input to the input layer 810, which is a vector to which 1 is mapped corresponding to "강남역," may be propagated to the output layer 850 through the hidden layer 830, and the output layer 850 may output a feature vector, for example, abstracted sentence information, corresponding to the one-hot vector, for example, the vector to which 1 is mapped corresponding to "강남역."

The neural network 715 included in the encoder 710 may include a recurrent neural network (RNN), as only an example. Thus, when encoding sub-words subsequent to a second sub-word, a result of encoding at least one preceding sub-word may have an influence.

For example, when a second sub-word is "까지," a one-hot vector to which 1 is mapped corresponding to "까지" may be input to the input layer 810. When the one-hot vector to which 1 is mapped corresponding to "까지" is propagated to the output layer 850, nodes included in the hidden layer 830 may additionally receive, as an input, outputs of the nodes of the hidden layer 830 that propagates the first sub-word.

Thus, when the sub-words in the first language are sequentially input to the input layer 810 of the neural network 715, a feature vector to be finally output may be generated.

Figure 9:
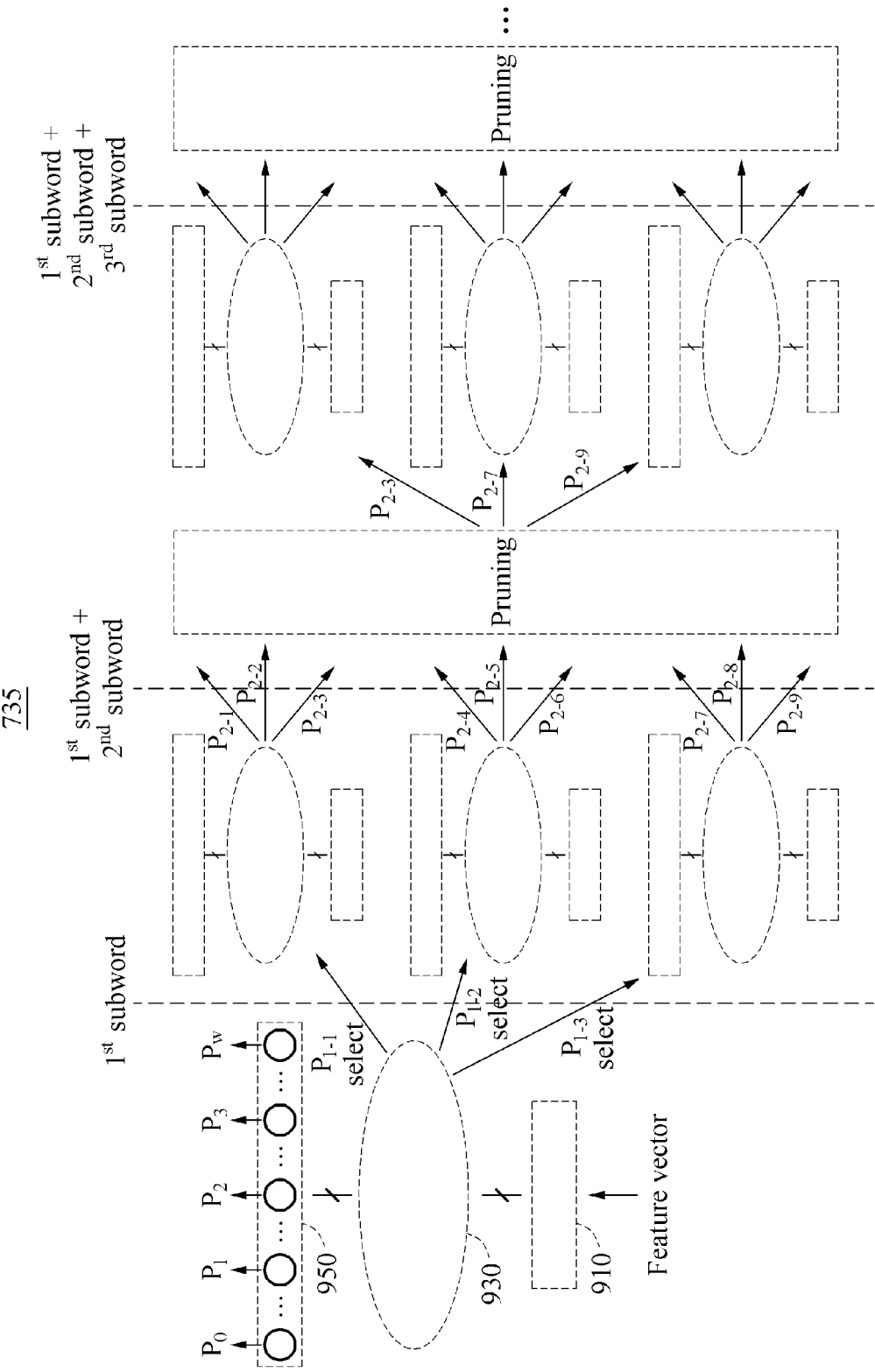
FIG. 9 is a diagram illustrating an example of a structure and an operation of a neural network included in a translation decoder.

FIG. 9 is a diagram illustrating an example of a structure and an operation of a neural network, such as neural network 735 included in the decoder 730 of FIG. 7, as only an example. Referring to FIG. 9, the example neural network 735 includes an input layer 910, a hidden layer 930, and an output layer 950.

The neural network 735 may generate candidate sentences in a second language by decoding a feature vector generated by the encoder 710 of FIG. 7. The input layer 910 of the neural network 735 may receive the feature vector finally generated by the encoder 710. The feature vector may be propagated to the output layer 950 through the hidden layer 930. A dimension of the output layer 950 may correspond to a dimension of a dictionary including sub-words in the second language. Each node included in the output layer 950 may correspond to each of the sub-words in the second language, and an output value of each node in the output layer 950 may indicate a probability that a sub-word corresponding to each node is to be output. An automated translation apparatus performing a beam search algorithm may select a preset number of candidate sub-words, for example, top three candidate sub-words with highest probability values. For example, three scores, for example, $P_{1-1}$, $P_{1-2}$, and $P_{1-3}$, corresponding to respective probability values or scores that the feature vector is indicated among preset 30,000 sub-words, may be propagated to a next stage.

When the candidate sub-words are selected, a subsequent candidate sub-word may be decoded in response to each candidate sub-word. Here, similar to the operation of the neural network 715 of the encoder 710, state information of the hidden layer 930 of the neural network 735 of the decoder 730 may be transferred to a subsequent hidden layer(s). For example, to determine an i-th sub-word, the neural network 735 may determine a probability value or a score of the i-th sub-word based on determined first through i−1th sub-words.

Through the process described in the foregoing, a sequence of the candidate sub-words may be generated, and a candidate sentence in the second language may be formed by the sequence of the candidate sub-words. However, when a preset number of candidate sub-words, for example, three candidate sub-words, are selected each time a sub-word is decoded, the number of final candidate sentences may increase exponentially. To prevent such an exponential increase, pruning may be applied to each stage. The pruning may be used to maintain the number of candidate sentences to be a preset number. For example, through the pruning, only three candidate sentences may be selected from nine candidate sentences generated by decoding sub-words up to a second sub-word and the selected candidate sentences may be propagated to a next stage.

In an example, when a sub-word is selected at one stage, a hidden layer at a next stage may change due to the selected sub-word. For example, an embedding vector indicating the selected sub-word may be applied to an internal state of nodes included in the hidden layer at the next stage.

Figure 10:
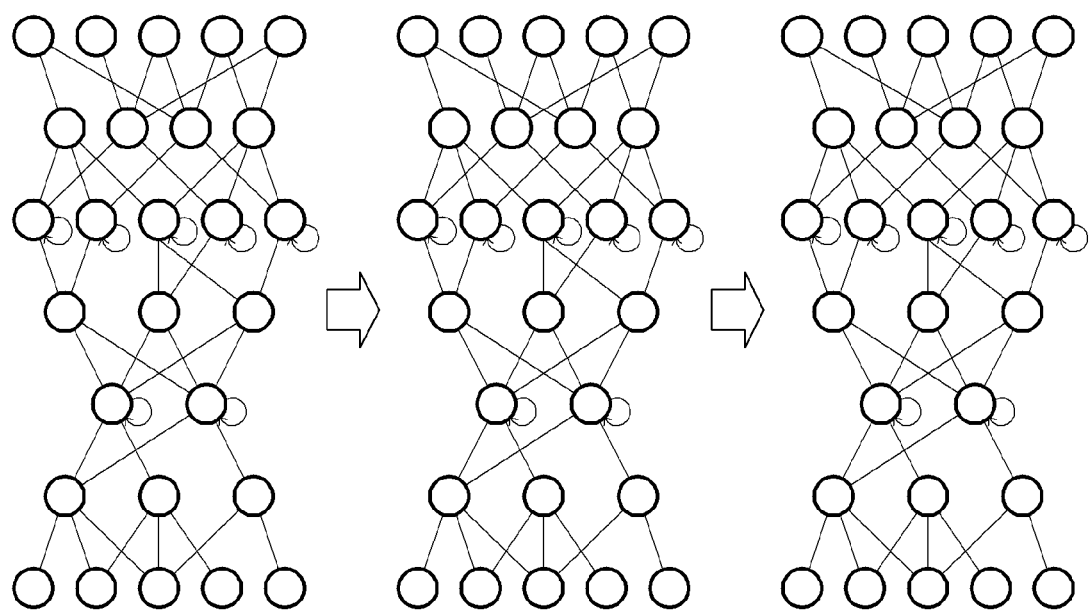
FIG. 10 is a diagram illustrating an example of a recurrent neural network (RNN) included in a neural network.

FIG. 10 is a diagram illustrating an example of an RNN included in an example neural network, such as an example RNN for the respective neural networks of FIGS. 8 and 9. FIG. 10 illustrates an example of a structure of the RNN.

The RNN may have a structure suitable to handle data including sequential information, such as a voice or speech, music, a character string, and a video, as only examples.

The RNN may recognize a regular pattern from the data, and extract abstract information. Here, the term "recurrent" may include a meaning of repetition, and indicate that a certain portion of the neural network may have a repetitive structure. The recurrence or the repetition of a certain portion of the neural network may indicate that a same task is applied to all elements of one sequence and an output result is affected by a result of a previous calculation.

In the structure of the RNN illustrated in FIG. 10, a neuron in a hidden layer includes an arrow indicating the neuron itself. The arrow indicating each neuron itself in the hidden layer may represent a recurrent structure, and such an arrow may be referred to as a recurrent weight.

The recurrent weight may have a function of remembering or reinforcing information on previous data, and use such information when processing new data. That is, the RNN may determine information in recurrent or sequential data in a same manner that, in a conversation or dialogue among users, a user involved in the conversation or dialogue understands contents of current conversation or dialogue based on a context in previous conversation or dialogue by recalling contents of the previous conversation or dialogue, which may be a principle of the RNN to learn the recurrent or sequential data.

For example, the recurrent weight may connect a neural network at a previous point in time t−1 and a neural network at a current point in time t, and also connect a neural network at a previous point in time t−2 and the neural network at the previous point in time t−1. The RNN may expand a model by tracing back to time infinitely, and thus information may be continuously transferred from previous initial data to current data.

FIG. 11 is a diagram illustrating an example of a configuration of an automated translation apparatus 1100. The automated translation apparatus 1100 may correspond to the translation apparatus 100 of FIG. 1, though embodiments are not limited thereto Referring to FIG. 11, the translation apparatus 1100 includes a plurality of translation processors 1110, a processor 1130, a memory 1150, and a transceiving interface 1170. The translation processors 1110, the processor 1130, the memory 1150, and the transceiving interface 1170 may be connected to one another through a bus, such as illustrated in FIG. 12A.

Each of the translation processors 1110 includes a receiver 1111, an encoder 1113, and a decoder 1115. Each of the translation processors may further include a rescoring model. An example receiver 1111 may receive a source sentence in a first language, such that the corresponding encoder 1113 may generate a feature vector by encoding the source sentence received by the receiver 1111, the corresponding decoder 1115 may generate candidate sentences in a second language by decoding the feature vector generated by the encoder 1113. Each of the decoders 1115 may generate a corresponding preset number of candidate sentences for the corresponding translation processor 1110 by respectively decoding the corresponding feature vector using, for example, an m-best or n-best beam search algorithm. In an example, a corresponding rescoring model of each translation processor 1110 may identify the corresponding highest scoring candidate sentence and output that highest scoring candidate sentences as a final candidate sentence to the processor 1130.

The processor 1130 may select a final translation sentence in the second language from the respectively provided final candidate sentences generated by each of the translation processors 1110. The processor 1130 may calculate scores of the final candidate sentences in the second language and select, as the final translation sentence in the second language, a final candidate sentence having a highest score among the final candidate sentences in the second language. The processor 1130 may calculate the scores of the final candidate sentences in the second language from each of the translation processors 1110. Alternatively, rather than only a highest scoring final candidate sentence being provided from each translation processor 1110 to the processor 1130, a preset number or all of the respective candidate sentences from each of the decoders 1115 may be provided or made available to the processor 1130, and the processor 1130 may determine a highest scoring candidate sentence from all generated candidate sentences as the final translation sentence.

The processor 1130 may control operations of one or more of the translation processors 1110, such as by controlling a varying or change of at least one of the source sentence to be input to at least one of the translation processors 1110, aspects or operations of an encoder included in the at least one translation processor, and aspects or operations of a decoder included in the at least one translation processor. The processor 1130 may also selectively control which encoder or which decoder, with previously defined aspects and operations, are changed to be used by any of the translation processors 1110 instead of their existing encoder and/or decoders or set encoder or decoder. The processor 1130 may further control which of the translation processors 1110 are selectively operated to perform translation operations for the source sentence or changed source sentence.

In the example where the processor 1130 varies or changes the source sentence, the processor 1130 may perform at least one of a changing of a word order of the source sentence to be input to the at least one translation processor based on information associated with the first language, or a replacing, with a synonym, of a word included in the source sentence to be input to the at least one translation processor.

In an example, the processor 1130 may control or perform at least one of an operation of varying or changing the encoder, or encoding operations thereof, included in the at least one translation processor by applying noise to a parameter value or an activation function to be applied to the encoder, or an operation of varying or changing the decoder, or decoding operations thereof, included in the at least one translation processor by applying noise to a parameter value or an activation function to be applied to the decoder. In another example, the processor 1130 may control or perform at least one of an operation of replacing the encoder included in the at least one translation processor with, or alternatively using, an encoder having been trained by a different initial training value, training set, and/or a training sequence, and/or an operation of replacing the decoder included in the at least one translation processor with, or alternatively using, a decoder having been trained a different initial training value, training set, and/or training sequence.

In addition, the processor 1130 may perform at least one, or more, or all processes described above with reference to FIGS. 1 through 10. For example, the processor 1130 may be configured to implement computer executable instructions, such as computer executable instructions in/on one or more non-transitory computer readable media, e.g., in memory 1150, to control the translation apparatus 1100 to implement any or any combination or all of the above example described operations.

The memory 1150 may store the respectively identified candidate sentences in the second language, such as the candidate sentences respectively identified by each of the decoders 1115 of the different translation processors or translation operations. The memory 1150 may further store the respective rescored results of each the candidate sentences, as well as the respective final candidate sentence identified for each of the translation processors or translation operations. The memory 1150 may further store the final translation sentence in the second language selected from among the final candidate sentences. In addition, the memory 1150 may store information received through the transceiving interface 1170. The memory 1150 may also store various pieces of data and executable instructions. The memory 1150 may include a volatile memory and a non-volatile memory. The memory 1150 may include a mass storage medium, such as, for example, a hard disk, and store various pieces of data. For example, the memory 1150 may include a database using at least one hard disk and store, in the database, the candidate sentences in the second language. The memory 1150 may further store the aforementioned acoustic and language models that may be implemented to recognize the source sentence in the first language, as well as example corresponding recognition neural network encoder and decoder implementations and results of the same.

The transceiving interface 1170 may output the final sentence in the second language outside of the translation apparatus 1100. For example, referring to FIG. 1, the transceiving interface 1170 may be included in the agent 105, for outputting of the final translation sentence.

FIGS. 12A and 12B illustrate examples of automated translation apparatuses. The automated translation apparatuses of FIGS. 12A and 12B may perform any one or any combination of the operations described above with regard to FIGS. 1-11, noting that embodiments are not limited to the same. In addition, the automated translation apparatuses of FIGS. 12A and 12B may correspond to any one or any combination of the automated translation apparatuses of FIGS. 1 and 7-11, noting that embodiments are not limited to the same. Referring to FIGS. 12A and 12B, the respective automated translation apparatuses 1200 include a memory 1210 and a processor 1220. Here, the memory 1210 and processor 1220 may correspond to the processor 1130 and memory 1150 of FIG. 11, though embodiments are not limited thereto. The automated translation apparatuses 1200 may further include a voice recognizer 1230 and/or a translator 1240, such as illustrated in FIG. 12A. Alternatively, the voice recognizer 1230 and/or the translator 1240 may be included in the processor 1220 as configured. The recognizer 1230 may correspond to the recognizer discussed above with respect to the agent 105 of FIG. 1, though embodiments are not limited thereto. In addition, as only an example, the respective automated translation apparatuses 1200 may include the translator 1240 and not include the voice recognizer 1230, or may include the voice recognizer 1230 and not include the translator 1240, e.g., in which case the translator 1240 is representative of a remote server. The translator 1240 may further correspond to the translator 110, rescoring models 150, and processor 170 of FIG. 1 or the translation processors 1110 or translation processors 1110 in combination with processor 1130 of FIG. 11. In an example, the memory 1210, the processor 1220, the voice recognizer 1230, and the translator 1240 communicate with one another through a bus 1250, such as illustrated in FIG. 12A.

The memory 1210 includes a volatile memory and a non-volatile memory to store information received through the bus 1250, for example. The memory 1210 includes a database configured to store knowledge sources or other information generated or used in respective translation processes of automated translation by the translation processors 1110 and/or processor 1130 of FIG. 11, or such as in any or any combination of processes discussed above with respect to FIGS. 1-11. The memory 1210 also stores various types of data and programs. In an embodiment, as a non-transitory computer readable storage medium, the memory 1210 may store instructions that, when executed by the processor 1220, for example, cause the processor 1220 to perform any or any combination of the aforementioned processes regarding FIGS. 1-11. Alternatively, another memory may be included in the respective automated translation apparatuses 1200 and may store the instructions and/or another processor of the respective automated translation apparatuses 1200 may execute the stored instructions.

The processor 1220 may perform an operation of the agent 105 described with reference to FIG. 1. For example, in one or more embodiments, the processor 1220 transfers a voice of a user, e.g., captured by a microphone represented by the user interface 1260 of the automated translation apparatus 1200 of FIG. 12B, to the voice recognizer 1230 and receives the first language sentence from the voice recognizer 1230. Also, in one or more embodiments, the processor 1220 transfers the first language sentence to the translator 1240, which may generate respectively same or different feature vectors for different translation operations. For example, the translator 1240 may include one or more encoders and multiple decoders. The processor 1220 may receive a final translation as the second language sentence from the translator 1240, e.g., after respective rescoring models are implemented and a ranking of the results of the same. In one or more embodiments, the processor 1220 may be, or configured to be, a controller configured to control performances of such transferences and/or respective operations of the voice recognizer 1230 and transmitter 1240 to respectively generate the first language sentence, perform respective encodings of the first language sentence into feature vectors, and perform respective decodings of the feature vectors in a second language, generate respective scored candidate translations, and a ranked result as a final translation result of the translator 1240. The processor 1220 may further control operations of the agent to provide the final translation results to a user. In addition, in one or more embodiments the processor 1220, or another processor, may perform sampling of the voice of the user and provision of the resulting sampled audio frames to the voice recognizer 1230.

In one example, the voice recognizer 1230 and the translator 1240 are implemented independently of the processor 1220. In this example, the voice recognizer 1230 and the translator 1240 are implemented using processor or computing resources differing from the processor 1220, and may be implemented by the same processor or computing resources or by different processor or computing resources. In addition, in an embodiment, the voice recognizer 1230 and the translator 1240, e.g., any of the translation processors of the translator 1240 or the entire translator 1240, are located external or remote from the respective automated translation apparatuses 1200 and communicate with the respective automated translation apparatuses 1200 through a wired or wireless network, for example. The user interface 1260 illustrated in FIG. 12B may be representative of hardware wired and/or wireless communication modules, as well as other user interface devices, such as a keyboard, touch screen, mouse, or stylus, as only examples. In such external or remote examples, the processor 1220 may perform the sampling of the voice of the user, such as of an analog signal captured by the microphone represented by the user interface 1260, and then using the hardware communication module(s) communicate the same to one or more external servers, as only an example, that respectively include the voice recognizer 1230 and/or the translator 1240. The final second language translation may be determined from a candidate sentence list by the translator 1240, e.g., where the candidate list may be generated from respective results of the rescoring models 150 of FIG. 1, which may then rank the translation candidates in the candidate list and communicate the final second language translation to the processor 1220 of the respective automated translation apparatuses 1200, which may be further configured to then output the translation to the user either visually and/or audibly. For example, the user interface 1260 may represent a voice synthesizer and speaker that audibly outputs the translation, and/or the display 1270 may visually display the translation through text out on the screen of the display 1270.

In an example, the voice recognizer 1230 and the translator 1240 are implemented through the processor 1220 and the memory 1210, such as through recognition and translation modeling. For example, one or more neural networks included in the voice recognizer 1230, including an example where respective neural networks are included in a recognition encoder and a recognition decoder of the voice recognizer 1230, and/or one or more neural networks included in the translator 1240, including an example where respective neural networks are included in each of the respective translation encoders and translation decoders of the translator 1240, may be stored in the memory 1210. In an example, each of the neural networks may be stored in the memory 1210 in a form of executable object file or execution file, as only examples. In addition, parameters for each of the neural networks may also be stored in the memory 1210. In such examples, the processor 1220 loads the neural networks from the memory 1210 and applies the parameters for each of the neural networks, thereby implementing recognition of the voice recognizer 1230 and respective translation operations of the translator 1240. In another example, the processor 1220 loads the neural networks from the memory 1210 and applies the parameters for each of the neural networks, thereby implementing the encoder and the decoder of the voice recognizer 1230 and the encoder and the decoder of the translator 1240.

In another example, the processor 1220 may encode frames of the sampled voice signal in a first language and generate the first feature vector with respect to the first language. The processor 1220 may then decode the first feature vector and generate the first language sentence in the first language. The processor 1220 may encode the first language sentence with respect to a second language and generate the second feature vector with respect to the second language, the processor 1220 may further generate different second feature vectors with respect to the second language, such as discussed above. The processor 1220 may then perform multiple respective decodings of the respective second language vectors, rescore the respective results of the same, and then rank those rescored results to generate and output the second language sentence in the second language as a final translation of the sampled voice signal in the first language. Referenced outputs or results generated in voice recognition processes and referenced outputs or results generated in deep learning machine translation processes, according to one or more embodiments, may be transferred to the memory 1210. In addition, though embodiments may discuss that any of such outputs or generated results may be transferred between the processor 1220, the voice recognizer 1230, and/or the translator 1240, embodiments also include the respective processor 1220, voice recognizer 1230, and/or translator 1240 storing their respective outputs or results to respective local caches, the memory 1210, or any other memories so as to be available for acquiring or requesting from such local caches, the memory 1210, or other memories by any of the processor 1220, voice recognizer 1230, and/or translator 1240. The automated translation apparatus 100, automated translation apparatuses 1100, automated translation apparatus 1200, agent 105, translator 110, translator 1240, respective translation processors 111-119, respective GPUs 1-5, translation processor 700, respective translation processors 1110, respective processor rescoring models 150, respective rescoring models 750, voice recognizer 1230, processor 170, processor 1130, respective processors 1220, respective encoders A, respective encoders A', respective decoders B, respective decoders B', respective encoders 710, respective decoders 730, respective encoders 1113, respective decoders 1115, respective receivers 1111, memory 1150, respective memories 1210, transceiving interface 1170, user interface 1260, display 1270, respective neural networks 715, and respective neural networks 735, and RNN of FIG. 10, as only examples, and in FIGS. 1 and 7-12B, that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

In one or more embodiments, the methods and processes illustrated in FIGS. 1-12B that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

As non-exhaustive examples only, and in differing embodiments, an automated translation apparatus as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a stationary device, such as a desktop PC, a high-definition television (HDTV), a DVD player, a Blu-ray player, a set-top box, or a home appliance, or any other mobile or stationary device configured to perform wireless or network communication. For example, such automated translation discussed herein may be implemented in hardware, such as a mobile device, television, or PC, implementing video conferencing, such as to output and display subtitles in real time with a concurrent video conference. The automated translation apparatus or system according to one or more embodiments may be a vehicle, a public transportation kiosk or interface, or other user interface. In another example, a mobile device according to one or more embodiments may be configured to automatically translate public announcements, such as in public transportation systems or audible public warning systems. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard. These examples are for demonstrative purposes and should not be interpreted as limiting of application or implementation of the automated translation apparatus or system.

While this disclosure includes specific examples, it will be apparent after an understanding of the disclosure of this application t that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented translation method comprising:
   performing, using one or more processors, plural different translation processes, in parallel, for a source sentence in a first language, including
   generating first respective feature vectors by encoding the source sentence in each of two or more translation processes of the plural different translation processes, and generating second respective feature vectors by encoding the source sentence and a variation of the source sentence in at least one translation process of the plural different translation processes, and
   generating respective plural candidate sentences in a second language by decoding each of the first respective feature vectors and the second respective feature vectors; and
   selecting a final sentence in the second language from the respective plural candidate sentences in the second language,
   wherein the generating of the respective candidate sentences includes generating a preset number of candidate sentences in each translation process using respective m-best beam search algorithms, with the m-best beam search algorithm being a beam search algorithm with less complexity than an n-best beam search algorithm, with n being greater than m.

2. The method of claim 1,
   wherein the plural different translation processes are respectively implemented through different graphic processor units (GPUs), each of the GPUs including a translation encoder and a translation decoder, and
   wherein the source sentence is input to at least two of the GPUs or the source sentence is input to at least one of the GPUs and the variation of the source sentence is input to another at least one of the GPUs, to perform the different translation processes.

3. The method of claim 1, wherein the plural different translation processes are respectively implemented through the one or more processors, of a translation system, that each include one or more translation encoders of plural encoders of the translation system and one or more translation decoders of plural decoders of the translation system,
   where the translation method further includes inputting, in parallel, the source sentence to at least two of the plural encoders.

4. The method of claim 3, further comprising:
   inputting the variation of the source sentence to at least one of the plural encoders, varying at least one of the plural encoders, and/or varying at least one of the plural decoders, for the performing of the plural different translation processes.

5. The method of claim 4, further comprising:
   generating the variation of the source sentence by changing a word order of the source sentence based on information associated with the first language and/or replacing, with a synonym, a word included in the source sentence based on the information associated with the first language; and
   inputting the variation of the source sentence to the at least one of the plural encoders.

6. The method of claim 4, further comprising:
   performing the varying of the at least one of the plural encoders, including changing the at least one encoder by respectively applying noise to a corresponding parameter value or a corresponding activation function to be respectively applied to the at least one encoder; or
   performing the varying of the at least one of the plural decoders, including changing the at least one decoder by respectively applying noise to a corresponding parameter value or a corresponding activation function to be respectively applied to the at least one decoder.

7. The method of claim 3, further comprising:
   varying or changing an encoder in at least one of the one or more processors and/or varying or changing a decoder in at least one of the one or more processors, for the performing of the plural different translation processes.

8. The method of claim 7, further comprising at least a correspondingly one of:
   performing the varying or changing of the encoder by replacing the encoder with another encoder having been trained by at least one of a different initial training value, training set, or training sequence than an initial training value, training set, or training sequence that was used to train the encoder; and
   performing the varying or changing of the decoder by replacing the decoder with another decoder having been trained by at least one of a different initial training value, training set, or training sequence than an initial training value, training set, or training sequence that was used to train the decoder.

9. The method of claim 1, wherein the selecting of the final sentence in the second language comprises:
   calculating respective scores of multiple candidate sentences, of the respective plural candidate sentences, in the second language; and
   selecting, as the final sentence in the second language, one of the multiple candidate sentences that has a highest score among the multiple candidate sentences in the second language.

10. The method of claim 9, wherein the calculating of the respective scores of the multiple candidate sentences in the second language comprises:
    calculating respective scores of only a single candidate sentence in the second language from each of the translation processes.

11. The method of claim 1, wherein the selecting of the final sentence in the second language comprises:
calculating scores corresponding to each of corresponding candidate sentences in the second language in each of the translation processes using respective rescoring models;
recalculating scores corresponding to one or more of the corresponding candidate sentences from each of the translation processes using statistics of scores corresponding to each of the one or more of the corresponding candidate sentences; and
selecting, as the final sentence in the second language, one of the one or more of the corresponding candidate sentences that has a highest recalculated score among the recalculated scores.

12. A non-transitory computer-readable storage medium storing instructions that, when executed by the one or more processors, cause the one or more processors to perform the method of claim 1.

13. A translation apparatus comprising:
at least one processor, of one or more processors, configured to perform plural different translation processes, in parallel, for a source sentence in a first language through
generation of first respective feature vectors by an encoding of the source sentence in each of two or more translation processes of the plural different translation processes, and generation of second respective feature vectors by an encoding of the source sentence and a variation of the source sentence in at least one translation process of the plural different translation processes, and
generation of respective plural candidate sentences in a second language by a decoding of each of the first respective feature vectors and the second respective feature vectors; and
an output processor, of the one or more processors, configured to select a final sentence in the second language from the respective plural candidate sentences in the second language,
wherein the generating of the respective candidate sentences includes generating a preset number of candidate sentences in each translation process using respective beam search algorithms,
wherein the respective beam search algorithms are m-best beam search algorithms with less complexity than an n-best beam search algorithm, as n being greater than m.

14. The translation apparatus of claim 13, wherein each of the one or more processors includes at least one encoder to perform a corresponding encoding of the source sentence to generate a feature vector and at least one decoder to perform a corresponding decoding of the feature vector and to generate plural candidate sentences in the second language for the source sentence.

15. The translation apparatus of claim 13,
wherein the translation apparatus includes different graphic processor units (GPUs) to respectively perform the plural different translation processes, each of the GPUs including a translation encoder and a translation decoder, and
wherein the translation apparatus is configured to input the source sentence to at least two of the GPUs or the translation apparatus inputs the source sentence to at least one of the GPUs and the variation of the source sentence to another at least one of the GPUs, to perform the different translation processes.

16. The translation apparatus of claim 13, wherein the plural different translation processes are respectively implemented through at least one processor, of the one or more processors and of a translation system, that each include one or more translation encoders of plural encoders of the translation system and one or more translation decoders of plural decoders of the translation system,
where the translation apparatus is configured to input, in parallel, the source sentence to at least two of the plural encoders.

17. The translation apparatus of claim 16, wherein the output processor is configured to generate the variation of the source sentence and implement encoding of the generated variation of the source sentence in at least one of the translation processes, to implement a varying of at least one of the plural encoders, and/or to implement a varying of at least one of the plural decoders, for the performing of the plural different translation processes.

18. The translation apparatus of claim 16, wherein a processor, of the one or more processors, is configured to generate the variation of the source sentence and implement encoding of the generated variation of the source sentence in at least one of the translation processes, to implement a varying of at least one of the plural encoders, and/or to implement a varying of at least one of the plural decoders, for the performing of the plural different translation processes.

19. The translation apparatus of claim 18,
wherein the processor is configured to generate the variation of the source sentence and implement the encoding of the generated variation of the source sentence in the at least one of the translation processes, and
wherein, for the generating of the variation of the source sentence, the processor is configured to perform at least one of the following operations of:
changing a word order of the source sentence based on information associated with the first language; and
replacing, with a synonym, a word included in the source sentence based on the information associated with the first language.

20. The translation apparatus of claim 18, wherein, for the implementing of the varying of the at least one of the plural encoders and/or the implementing of the varying of the at least one of the plural decoders, the processor is configured to correspondingly perform at least one of the following operations of:
changing the at least one of the plural encoders by respectively applying noise to a corresponding parameter value or a corresponding activation function to be respectively applied to the at least one of the plural encoders; and
changing the at least one of the plural decoders by respectively applying noise to a corresponding parameter value or a corresponding activation function to respectively be applied to the at least one of the decoders.

21. The translation apparatus of claim 13, wherein the plural different translation processes are respectively implemented through plural translation processors, of the one or more processors, that each include a translation encoder and a translation decoder,
a processor, of the one or more processors and for implementing the plural different translation processes, is configured to implement a changing or varying of one of the translation encoders of the plural translation processors by replacing the one translation encoder with another encoder having been trained by a different initial training value, training set, or training sequence than an initial training value, training set, or training sequence that was used to train the one translation encoder, and/or configured to implement a changing or varying of one of the translation decoders of the plural translation processors by replacing the one translation decoder with another decoder having been trained by a different initial training value, training set, or training sequence than an initial training value, training set, or training sequence that was used to train the one translation decoder.

22. The translation apparatus of claim 13, wherein the output processor is further configured to calculate respective scores of multiple candidate sentences, of the respective plural candidate sentences, in the second language and select, as the final sentence in the second language, one of the multiple candidate sentences that has a highest score among the multiple candidate sentences in the second language.

23. The translation apparatus of claim 22, wherein, for the calculating of the respective scores of the multiple candidate sentences in the second language, the output processor is configured to calculate scores for only a single candidate sentence in the second language from each of the translation processes.

24. The translation apparatus of claim 13, wherein, for performing the selecting of the final sentence in the second language, the output processor is configured to:
   calculate scores corresponding to each of corresponding candidate sentences in the second language in each of the translation processes using respective rescoring models;
   recalculate scores corresponding to one or more of the corresponding candidate sentences from each of the translation processes using statistics corresponding to each of the one or more of the corresponding candidate sentences; and
   select, as the final sentence in the second language, one of the one or more of the corresponding candidate sentences that has a highest recalculated score among the recalculated scores.

25. The translation apparatus of claim 13, further comprising one or more memories, of plural memories of the translation apparatus, configured to store the respective plural candidate sentences or select candidate sentences, from the respective plural candidate sentences and respectively resulting from the plural different translation processes.

26. The translation apparatus of claim 25, further comprising at least one memory, of the plural memories, that is a non-transitory computer readable medium storing instructions, that when executed by the one or more processors, controls the one or more processors to be configured to perform the plural different translation processes and the selecting of the final sentence.

27. The translation apparatus of claim 13, wherein the at least one processor configured to perform the plural different translation processes and the processor configured to select the final sentence are a same processor of the one or more processors.

28. A processor implemented translation method, the method comprising:
   performing, using one or more processors, plural different translation processes for a source sentence in parallel, wherein
   the plural different translation processes are different with respect to one or more of plural translation encoding processes being different in the plural different translation processes,
   the source sentence and a variation of the source sentence being respectively encoded by a same translation encoding process in different translation processes of the plural different translation processes,
   the source sentence being respectively encoded by different translation encoding processes in corresponding different translation processes of the plural different translation processes, and plural translation decoding processes being different in the plural different translation processes; and
   outputting a translation result of the source sentence based on a determined highest ranked candidate sentence respectively resulting from the different translation processes,
   wherein a translation decoding process of at least one of the plural different translation processes implements an m-best beam search algorithm to determine candidate sentences, with the m-best beam search algorithm being a beam search algorithm with less complexity than an n-best beam search algorithm, with n being greater than m.

29. A non-transitory computer-readable storage medium storing instructions that, when executed by the one or more processors, cause the one or more processors to perform the method of claim 28.

30. A processor implemented translation method, the method comprising:
   performing, using one or more processors, plural different translation processes for a source sentence in parallel, including at least two of
   first encoding and first decoding the source sentence,
   differently encoding and/or differently decoding the source sentence,
   first encoding and first decoding one or more variations of the source sentence, and
   differently encoding and/or differently decoding the one or more variations of the source sentence,
   where each of the plural different translation processes include respective translation encoding and translation decoding processes, to generate respective candidate lists from each of the plural different translation processes;
   ranking candidate sentences from each of the respective candidate lists; and
   outputting a translation result of the source sentence based on a determined highest ranked candidate sentence based on the ranking,
   wherein each of the translation decoding processes implements an n-best beam search algorithm to generate the candidate list for each of the plural different translation processes, with the m-best beam search algorithm being a beam search algorithm with less complexity than an n-best beam search algorithm, with n being greater than m.

31. A non-transitory computer-readable storage medium storing instructions that, when executed by the one or more processors, cause the one or more processors to perform the method of claim 30.

32. A processor implemented translation method, the method comprising:
   performing, using one or more processors, plural different translation processes for a source sentence in parallel, including at least two of first encoding and first decoding the source sentence,
differently encoding and/or differently decoding the source sentence,
first encoding and first decoding one or more variations of the source sentence, and
differently encoding and/or differently decoding the one or more variations of the source sentence,
where each of the plural different translation processes include respective translation encoding and translation decoding processes, to generate respective candidate lists from each of the plural different translation processes;
ranking candidate sentences from each of the respective candidate lists; and
outputting a translation result of the source sentence based on a determined highest ranked candidate sentence based on the ranking,
wherein one or more of the translation decoding processes implements an m-best beam search algorithm to generate corresponding candidate lists, with the m-best beam search algorithm being a beam search algorithm with less complexity than an n-best beam search algorithm, with n being greater than m.

33. The method of claim 32, where the ranking of the candidate sentences includes applying respective rescoring models to each of the respective candidate lists, and less than all candidate sentences of each of the respective candidate lists are selectively, based on respective results from each applied rescoring model, reranked to find the highest ranked candidate sentence.

34. The method of claim 32, wherein one or more of the translation decoding processes selectively implements the n-best beam search algorithm to generate corresponding candidate lists respectively of n candidates while at least another of the translation decoding processes implements the m-best beam search algorithm to generate a corresponding candidate list of m candidates.

35. A non-transitory computer-readable storage medium storing instructions that, when executed by the one or more processors, cause the one or more processors to perform the method of claim 32.

36. The method of claim 32, wherein each of a plurality of the translation decoding processes is implemented by a corresponding trained translation decoder configured to perform the m-best beam search algorithm and output less than n candidate sentences from respective encoding results for the source sentence input to the corresponding translation decoder.

* * * * *